United States Patent [19]
Yoshino et al.

[11] Patent Number: 4,668,595
[45] Date of Patent: May 26, 1987

[54] SECONDARY BATTERY

[75] Inventors: Akira Yoshino, Fujisawa; Kenichi Sanechika; Takayuki Nakajima, both of Kawasaki, all of Japan

[73] Assignee: Asahi Kasei Kogyo Kabushiki Kaisha, Osaka, Japan

[21] Appl. No.: 861,423

[22] Filed: May 9, 1986

[30] Foreign Application Priority Data

| May 10, 1985 | [JP] | Japan | 60-97695 |
| May 11, 1985 | [JP] | Japan | 60-100101 |
| May 11, 1985 | [JP] | Japan | 60-100102 |
| Jun. 18, 1985 | [JP] | Japan | 60-130676 |
| Jun. 18, 1985 | [JP] | Japan | 60-130677 |
| Jun. 18, 1985 | [JP] | Japan | 60-130678 |

[51] Int. Cl.⁴ .................................... H01M 10/40
[52] U.S. Cl. .................................... 429/194; 429/218
[58] Field of Search ............... 429/194, 196, 197, 198, 429/211.8, 212; 252/182.1; 423/594, 593

[56] References Cited

U.S. PATENT DOCUMENTS

| 4,302,518 | 11/1981 | Goodenough et al. | 429/104 |
| 4,357,215 | 11/1982 | Goodenough et al. | 429/194 X |
| 4,497,726 | 2/1985 | Brule et al. | 429/194 X |

Primary Examiner—Anthony Skapars
Attorney, Agent, or Firm—Birch, Stewart, Kolasch & Birch

[57] ABSTRACT

This invention provides a secondary battery in a nonaqueous type using a substance indicated in I below and/or a substance indicated in II below as an active material for either of positive and negative electrodes:

I: a composite oxide possessing a layer structure and represented by the general formula:

$$A_xM_yN_zO_2$$

wherein A stands for at least one alkali metal, M for a transition metal, N for at least one member selected from the group consisting of Al, In, and Sn, and x, y, and z respectively for the number falling in a specific range, II: an n-doped carbonaceous material which has a BET-method specific surface area, and a crystal thickness, Lc, in the X-ray diffraction and a true density, $\rho$, both having the values falling in a specific range.

The secondary battery of this invention is small and light, excels in cyclicity and self-discharging property, and possesses a high energy density.

20 Claims, 9 Drawing Figures

SECONDARY BATTERY

BACKGROUND OF THE INVENTION

1. Field of the Invention

This invention relates to a novel secondary battery and particularly to a small, light secondary battery.

2. Description of the Prior Art

In recent years, electronic devices have been remarkably reduced in size and weight and, as a natural consequence, a need for batteries, i.e. power sources, to come in proportionately reduced sizes and weights. In the field of primary batteries, reductions in size and weight have already made, e.g., as in lithium cells. Since these are primary batteries, they cannot be recharged for repeated use and, therefore, have found utility in limited applications. In the field of secondary batteries, lead acid batteries and nickel-cadmium batteries have heretofore been used. These two types of secondary batteries both have posed a serious problem with respect to reduction in size and weight. From this point of view, nonaqueous secondary batteries have been arousing great interest but still need to be fully developed for practicability. One of the reasons for the lack of practicability is that none of the active materials so far developed for use in the aforementioned secondary batteries satisfy such practical properties as cyclicity and self-discharging.

Meanwhile, a new group of electrode active materials which make use of the phenomenon of intercalation or doping of a layer compound, a form of reaction substantially different from the reaction occurring in the conventional nickel-cadmium batteries and lead acid batteries, have come to attract growing attention.

Since these new electrode active materials involve no complicated electrochemical reaction during the course of recharging and discharging, they are expected to have a highly advantageous cyclicity of recharging and discharging.

As examples of the electrode active material making use of the intercalation of a layer compound, chalcogenide type compounds which possess a lamelar structure are attracting attention. For example, such chalcogenide compounds as $Li_xTiS_2$ and $Li_xMoS_3$ exhibit relatively satisfactory cyclicity but possess such low magnitudes of electromotive force that their practical discharge voltage is about 2 V at most even when Li metal is used as a negative electrode. With respect to the high electromotive force which constitutes one of the characteristics of nonaqueous batteries, therefore, these compounds are not satisfactory. Such metal oxide type compounds as $Li_xV_2O_5$, $Li_xV_6O_{13}$, $Li_xCoO_2$, and $Li_xNiO_2$ are attracting attention in respect that they are characterized by possessing high magnitudes of electromotive force. These metal oxide type compounds, however, are deficient in cyclicity and utility, namely the proportion in which the compounds are utilized for actual recharging and discharging, and further in terms of the factor of overvoltage involved during the course of recharging and discharging. They have not yet been fully developed to the level of practicability.

Particularly, such secondary-battery positive electrodes of $Li_xCoO_2$ and $Li_xNiO_2$ as disclosed in Japanese Patent Application Laid-open No. 136131/1980 possess magnitudes of electromotive force exceeding 4 V when Li metal is used as a negative electrode and exhibit surprisingly high magnitudes of theoretical energy density (per positive electrode active material) exceeding 1,100 WHr/kg. They nevertheless possess low proportions available for recharging and discharging and provide levels of energy density falling far short of theoretical values.

As one example of the electrode active material utilizing the phenomenon of doping, a secondary battery of a new type using an electroconductive macromolecular compound as an electrode material is disclosed in Japanese Patent Application Laid-open No. 136469/1981. The secondary battery using this electroconductive macromolecuar compound, however, entails serious outstanding problems such as instable properties evinced by low cyclicity and large self-discharge and has not yet reached the level of practicability.

In the specifications of Japanese Patent Application Laid-open No. 35881/1983, No. 173979/1984, and No. 207568/1984, it is proposed to use large surface-area carbon materials, like activated carbon, as electrode materials. These electrode materials have been found to manifest a specific phenomenon which, unlike the phenomenon of doping, is presumably ascribable to the formation of an electric double layer due to their large surface areas. They are claimed to manifest conspicuous properties particularly when they are used in positive electrodes. It is further stated that they are usable partly in negative electrodes. When these large surface-area carbon materials are used in negative electrodes, however, they have serious drawbacks in cyclicity and self-discharging. Moreover, the utilization coefficient, i.e. the proportion of electrons (or paired cations) reversibly released or received per carbon atom, is extremely low, even falling below 0.05 and generally falling in the range of 0.01 to 0.02. This fact implies that when these materials are used in negative electrodes of secondary batteries, the negative electrodes become very large both in weight and volume. This point poses a serious obstacle on the way to actual adoption of the materials.

The specification of Japanese Patent Application Laid-open No. 209864/1983 discloses as electrode materials such carbonaceous materials as carbonated phenolic fibers whose hydrogen atom/carbon atom ratio falls in the range of 0.33 to 0.15. It discloses, that the carbonaceous materials manifest particularly desirable properties when they are used as positive electrode materials p-doped mainly with anions and that they are also usable as negative electrode materials n-doped with cations. These materials have a serious disadvantage that they are deficient in cyclicity and self-discharging when they are used as n-doped negative electrodes. They have another serious disadvantage in that they possess extremely low utilization coefficients and lack practicability.

It has long been known to use graphite layer compounds as electrode materials for secondary batteries. It has been known the art that graphite layer compounds having incorporated therein such anions as $Br^\ominus$, $ClO_4^\ominus$, and $BF_4^\ominus$ ions are usable as positive electrodes. It is naturally conceivable that graphite layer compounds having incorporated therein such cations as $Li^\oplus$ ions are usable as negative electrodes. In fact, the specification of Japanese Patent Application Laid-open No. 143280/1984 discloses adoption as negative electrodes of graphite layer compounds which have cations incorporated therein.

The graphite layer compounds which have incorporated therein cations, however, are highly unstable. Particularly, the fact that they possess extremely high reactivity with electrolytes is evident from the report published by A. N. Dey, et al. in the "Journal of Electrochemical Society," Vol. 117, No. 2, pp 222-224, 1970. When the graphite which is capable of forming a layer compound, is used as a negative electrode, this negative electrode is hardly practicable because it lacks stability of the self-discharging property necessary for a battery and shows an extremely low utilization coefficient.

The new group of electrode active materials which utilize the phenomenon of intercalation or doping in their current conditions are such that the properties which are inherently expected of the materials have not yet been realized from the practical point of view.

SUMMARY OF THE INVENTION

This invention has been completed for the purpose of solving the various problems mentioned above and thereby providing a small, light secondary battery which excels in battery properties, particularly cyclicity and self-discharging and possesses a high energy density.

This invention provides a secondary battery composed essentially of positive and negative electrodes, a separator, and a nonaqueous electrolyte, which secondary battery is characterized by using a substance indicated in I below and/or a substance indicated in II below as an active material for either of said positive and negative electrodes.

I: a composite oxide possessing a layer structure and represented by the general formula:

$$A_xM_yN_zO_2$$

wherein A is at least one member selected from the group consisting of alkali metals, M is a transition metal, N is at least one member selected from the group consisting of Al, In, and Sn, and x, y, and z satisfy the expressions, $0.05 \leq x \leq 1.10$, $0.85 \leq y \leq 1.00$, and $0.001 \leq z \leq 0.10$ respectively.

II: an n-doped carbonaceous material which has a BET-method specific surface area, A (m$^2$/g), is in the range of $0.1 < A < 100$ and a crystal thickness, Lc (Å) X-ray diffraction, and a true density, $\rho$ (g/cm$^3$), satisfying the conditions, $1.70 < \rho < 2.18$ and $10 < Lc < 120\rho - 189$.

BRIEF DESCRIPTION OF THE DRAWINGS

FIG. 3-A shows the results of Example 1, FIG. 3-B those of Comparative Experiment 2, FIG. 4-A those of Example 11, FIG. 4-B those of Example 16, FIG. 4-C those of Comparative Experiment 10, FIG. 5-A those of Example 18, FIG. 5-B those of Example 23, FIG. 6-A those of Example 24, FIG. 6-B those of Comparative Experiment 18, FIG. 7-A those of Example 33, and FIG. 7-B those of Example 36.

DETAILED DESCRIPTION OF THE INENTION

Figure 1:
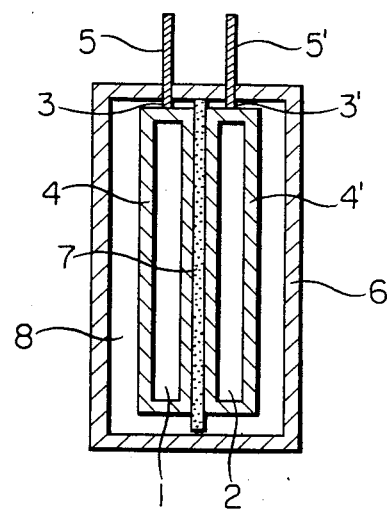
FIG. 1 is a sectional view showing a structure of the secondary battery of the present invention. In this diagram, 1 stands for a positive electrode, 2 for a negative electrode, 3 and 3' for current collecting rods, 4 and 4' for SUS nets, 5 and 5' for external electrode terminals, 6 for a battery case, 7 for a separator, and 8 for an electrolyte or solid electrolyte.

The novel composite layer metal oxide of the present invention is represented by the general formula, $A_xM_yN_zO_2$, wherein A is at least one member selected from the group of alkali metals such as, for example, Li, Na, and K. Among the alkali metals cited above, Li proves particularly desirable. The value of x varies in the range of $0.05 \leq x \leq 1.10$, depending on the condition of charging and the condition of discharging. By the charging, the A$^\oplus$ ion undergoes deintercalation and the value of x decreases. In the condition of complete charging, the value of x reaches 0.05. By discharging, the A$^\oplus$ ion undergoes intercalation and the value of x increases. In the condition of complete discharging, the value of x reaches 1.10.

In the general formula, M stands for a transition metal. In all the transistion metals effectively usable herein, Ni and Co prove particularly desirable. The value of y does not vary by charging or discharging and falls in the range of $0.85 \leq y \leq 1.00$. If the value of y is less than 0.85 or more than 1.00, there ensues such undesirable phenomena as degradation of cyclicity and elevation of overvoltage which are detrimental to the active material for a secondary battery.

In the general formula, N stands for at least one member selected from the group consisting of Al, In, and Sn. Among the members cited above, Sn proves particularly desirable. In the active material for the novel secondary battery of the present invention, N fulfils an extremely important function in improving the cyclicity particularly in deep charging and deep discharging cycles. The value of z does not vary by charging or discharging and falls in the range of $0.001 \leq z \leq 0.10$, preferably in the range of $0.005 \leq z \leq 0.075$. If the value of z is less than 0.001, the effect of N is not sufficiently manifested and the cyclicity in deep charging and deep discharging is degraded and the overvoltage during the course of deep charging is greatly increased. If this value exceeds 0.10, the hydroscopicity of the active material is enhanced so much as to render handling difficult and the basic properties of the active material are impaired.

The composite oxide for the active material of the novel secondary battery of the present invention can be produced by mixing oxides, hydroxides, carbonates, nitrates, or organic acid salts of the metals of A, M, and N and firing the resulting mixture in the air or in an atmosphere of oxygen at a temperature in the range of 600° to 950° C., preferably 700° to 900° C.

The time sufficient for firing generally falls in the range of 5 to 48 hours. The composite oxide, $A_xM_yN_zO_2$, which is obtained by the method described above has as a positive electrode of a secondary battery such a condition of discharge that the value of x generally falls in the range of 0.90 to 1.10.

The composite oxide, $A_xM_yN_zO_2$, obtained as described above undergoes the reaction of deintercalation and the reaction of intercalation by charging and discharging and, as a result, the value of x varies in the range of $0.05 < x < 1.10$.

The reactions mentioned above are expressed by the following formula.

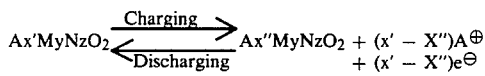

$$A_{x'}M_yN_zO_2 \underset{\text{Discharging}}{\overset{\text{Charging}}{\rightleftarrows}} A_{x''}M_yN_zO_2 + (x' - x'')A^{\oplus} + (x' - x'')e^{\ominus}$$

wherein x' stands for the value of x before charging and X" for the value of x after charging.

The aforementioned "utilization coefficient" denotes a value which is defined by the following formula.

$$\text{Utilization coefficient} = \frac{x' - x''}{y + z} \times 100 \, (\%)$$

The active material for the novel nonaqueous secondary battery of the present invention is characterized by having a large utilization coefficient. In other words, it exhibits a very stable cyclicity with respect to deep charging and discharging.

The composite oxide as the active material for the novel secondary battery of the present invention possesses a very noble potential of the order of 3.9 to 4.5 V relative to the Li standard potential and manifests a particularly satisfactory function when it is used as a positive electrode for a nonaqueous secondary battery.

The carbonaceous material to be used in the present invention requires to possess a BET-method specific surface area, A ($m^2/g$), not less than 0.1 and less than 100, desirably not less than 0.1 and less than 50, and more desirably not less than 0.1 and less than 25.

If this specific surface area is less than 0.1 $m^2/g$, the surface area is too small for the electrochemical reaction to proceed smoothly on the surface of the electrode. If the specific surface area is not less than 100 $m^2/g$, such properties as cycle life property, self discharging property, and current efficiency are degraded notably. The degradation of such properties may be logically explained by a supposition that since the surface area is so large, various secondary reactions occur on the surface of the electrode and exert adverse effects on the battery properties.

Further, the values of the crystal thickness, Lc (Å), in the X-ray diffraction and the true density, $\rho$ (g/cm$^3$), are required to satisfy the following conditions:

$1.70 < \rho < 2.18$ and $10 < Lc < 120\rho - 189$

Desirably, the values satisfy the conditions, $1.80 < \rho < 2.16$ and $15 < Lc < 120\rho - 196$ and $Lc > 120\rho - 227$. More desirably, the values satisfy the conditions, $1.96 < \rho < 2.16$ and $15 < Lc < 120\rho - 196$ and $Lc > 120\rho - 227$.

In this invention, the aforementioned values of the crystal thickness, Lc (Å), in the X-ray diffraction diagram and the true density, $\rho$ (g/cm$^3$), are extremely important when the n-doped carbonaceous material is used as a stable electrode active material.

For example, if the value of $\rho$ is not more than 1.70 or the value of Lc is not more than 10, the carbonaceous material is not in a sufficiently carbonized state. This fact means that ample crystal growth of carbon has not proceeded in the carbonaceous material and an amorphous phase occupies a very large proportion of the carbonaceous material. So long as the carbonaceous material has the aforementioned values below the lower limits of the specified ranges, it necessarily acquires a large surface area departing from the range of BET-method specific surface area of this invention during the course of carbonization. When the carbonaceous material of this description is n-doped, the n-doped material is very instable and the extent of doping itself is so small that the material cannot stably exist substantially as an n-doped composite and cannot be used as an active material for a battery.

If the value of $\rho$ exceeds 2.18 or the value of Lc exceeds the difference, $120\rho - 189$, the carbonaceous material has been carbonized to excess. This means that the carbonaceous material assumes a structure resembling graphite as a consequence of advanced crystallization of carbon.

Besides the true density, $\rho$ (g/cm$^3$), crystal thickness, Lc (Å), and BET-method specific surface area, A (m$^2$/g), defined in the present invention, the intersurface distance, $d_{002}$ (Å), based on X-ray diffraction is given, for example, as a parameter to indicate the structure of the above carbonaceous material. The value of the interface distance, $d_{002}$ (Å), becomes small as the crystallization proceeds. Although it is not particularly defined, the carbonaceous material having the value of less than 3.43 Å or less than 3.46 Å does not fall in the range defined by the present invention.

Meanwhile, the value of the aforesaid Raman strength ratio, R (I 1360 cm$^{-1}$/I 1580 cm$^{-1}$), is also a parameter to indicate the structure of the carbonaceous material. This value becomes small as the crystallization proceeds. Although it is not particularly defined, the carbonaceous material having the value less than 0.6 or not less than 2.5, or the carbonaceous material having the value of less than 0.7 or not less than 2.5 does not fall in the range defined by the present invention.

Graphite has a regular layer structure as described above. A carbonaceous material of such a structure forms a layer compound using a varying ion as a guest and a p type layer compound with an anion as $ClO_4^{\ominus}$ or $BF_4^{\oplus}$ possesses a high potential. Attempts have long been made to realize use of such a carbonaceous material as a positive electrode in a secondary battery. For this purpose, it is an essential requisite that the carbonaceous material should be capable of easily forming a layer compound. To be specific, as indicated in the specification of Japanese Patent Application Laid-open No. 36315/1985, it is a requisite that the Raman strength ratio, R (I 1360 cm$^{-1}$/I 1580 cm$^{-1}$), should be as small as possible, i.e. the value of $\rho$ and the value of Lc should be as large as possible.

The inventors, while performing various studies directed from a different point of view to the incorporation in the carbonaceous material of cations such as Li$^{\oplus}$ ion instead of anions, made an unexpected discovery. Specifically they have found that for the incorporation of such cations as Li$^{\oplus}$ ion, the carbonaceous material acquires better properties when it possesses an irregular structure to some extent. When the carbonaceous material to be used possesses a value of $\rho$ exceeding 2.18 and a value of Lc exceeding the difference of $120\rho - 189$, since it displays a behavior like graphite as described above, the secondary battery using this carbonaceous material possesses poor cycle life and self-discharging properties show a very low utilization coefficient, and in an extreme case substantially fails to function as a battery.

The carbonaceous material fulfilling the requirements imposed by the present invention is obtained by subjecting a varying organic compound to thermal decomposition or to carbonization by firing. In this case, the thermal hysteresis temperature condition is important. If the thermal hysteresis temperature is excessively low, the carbonization does not sufficiently proceed. The carbonaceous material consequently obtained not merely shows low electroconductivity but also fails to fulfil the conditions essential for this invention. The lower limit of this temperature is generally 600° C., preferably 800° C., though variable to some extent. More important is the upper limit of the thermal hysteresis temperature. By the heat treatment generally carried out at temperatures near 3,000° C. for the production of graphite and carbon fibers, the growth of crystals proceeds excessively and the function of the secondary battery active material is seriously impaired. Thus, the upper limit of the thermal hysteresis temperature is 2,400° C., desirably 1,800° C., and more desirably 1,400° C.

In the above heat treatment, the conditions such as a temperature increasing rate, a cooling rate, and a heat treating time can be determined depending on the objectives contemplated. A method which effects the heat treatment at a relatively low range of temperature and then, increases to a predetermined temperature may be adopted.

As one example of the carbonaceous material fulfilling the specific ranges imposed by this invention, carbon fibers produced by the vapor-phase growth method can be cited. The carbon fibers of the vapor-phase growth method are a carbonaceous material obtained, as disclosed in the specification of Japanese Patent Application Laid-open No. 207823/1984, by subjecting a carbon-source compound such as benzene, methane, or carbon monoxide to a vapor-phase thermal decomposition (at a temperature in the range of 600° C. to 1,500° C., for example) in the presence of a transition metal catalyst. All the products obtained by known similar methods are embraced by the carbonaceous material contemplated by this invention. Methods which effect the formation of such fibers on substrates (such as, for example, plates of ceramic and graphite and particles of carbon fibers, carbon black, and ceramic) and methods which effect the formation in a vapor phase are counted among such known methods. Generally by these methods, carbonaceous materials are obtained in the form of carbon fibers. In the present invention, such carbonaceous materials may be used in their fibrous form. Otherwise, they may be used in a powdered form.

It is a well-known fact that the carbon fibers of the vapor-phase growth method are a typical example of readily graphitizing carbon. In other words, the carbon fibers are characterized by being graphitized with extreme ease. The heat treatment for the graphitization is generally carried out at a temperature exceeding 2,400° C. The graphitized carbon fibers of the vapor-phase growth method have been already reported as possessing various characteristics beneficial for their adoption as graphite materials of a highly orderly crystalline structure. Endo et al., for example, have published in the "Synthetic Metals," Vol. 7, p. 203, 1983 their observation that the carbon fibers and an anion such as Br— jointly form a layer compound with extreme ease and that a temperature difference battery can be obtained by using the layer compound with the anion as a positive electrode and a negative electrode. This battery, however, generally possesses an extremely low electromotive force and hardly suits actual adoption.

Graphite has a regular layer structure as described above. A carbonaceous material of such a structure forms a layer compound using a varying ion as a guest and a layer compound with an anion such as $ClO_4^\ominus$ or $BF_4^\ominus$ possesses a high potential. Attempts have long been made to realize use of such a carbonaceous material as a positive electrode in a secondary battery. For this purpose, it is an essential requisite that the carbonaceous material should be capable of easily forming a layer compound. To be specific, as indicated in the specification of Japanese Patent Application Laid-open No. 36315/1985, it is a requisite that the heat treatment should be carried out at a temperature near 3,000° C. and the treated carbonaceous material should assume a structure of graphite. The inventors, while performing various studies directed from a different point of view to perfecting an n-doped material incorporating therein cations such as $Li^\oplus$ ion instead of anions, made an unexpected discovery. Specifically they have found that for the incorporation of such cations as $Li^\oplus$ ion, the carbonaceous material acquires better properties when it has not undergone excess thermal hysteresis.

The carbon fibers of the vapor-phase growth method to be used in the present invention prove to be advantageous when the highest thermal hysteresis temperature encountered in the whole operation including even the step of production is not higher than 2,400° C. desirably not higher than 2,000° C., and more desirably not higher than 1,400° C. If this temperature exceeds 2,400° C., the heat treatment brings about adverse effects on the properties of the n-doped material.

Another example of the carbonaceous material usable as the active material is a pitch type carbonaceous material. As concrete examples of the pitch usable in this invention, there may be cited petroleum pitch, asphalt pitch, coal tar pitch, crude oil cracked pitch, and petroleum sludge pitch, namely pitches obtained by thermal decomposition of petroleum and coal, pitches obtained by thermal decomposition of macromolecular polymers, and pitches obtained by thermal decomposition of organic low molecular compounds such as tetrabenzophenazine.

For the production of a pitch type fired carbonization product fulfilling the conditions of the present invention, the thermal hysteresis temperature condition is important. The thermal hysteresis at an excessively high temperature gives rise to an excessively crystallized carbonaceous material and seriously impairs the properties of the n-doped material. The thermal hysteresis temperature is not higher than 2,400° C., desirably not higher than 1,800° C., and more desirably not higher than 1,400° C.

The lower limit of the temperature is 600° C., the level at which the fired carbonization product begins to manifest electroconductivity and other similar properties, and more desirably 800° C.

One concrete example of the pitch type fired carbonization product is needle coke.

Another example of the carbonaceous material to be used in the present invention is a fired carbonization product of a polymer formed preponderantly of acrylonitrile. For the production of the fired carbonization product of a polymer formed preponderantly of acrylonitrile which fulfils the conditions of the present invention, the thermal hysteresis temperature condition is important. As described above, the thermal hysteresis at an excessively high temperature gives rise to a fired carbonization product of excessive crystal growth and seriously impairs the properties of the n-doped material. The thermal hysteresis temperature is not higher than 2,400° C., desirably not higher than 1,800° C., and more desirably not higher than 1,400° C.

The lower limit of the temperature is 600° C., the level at which the fired carbonization product begins to manifest electroconductivity and other similar properties, and more desirably 800° C.

It is evident from the results of the X-ray analysis, the Raman analysis, and the true density measurement that, unlike the ordinary graphite, the carbonaceous material of the present invention does not possess a layer structure capable of forming a layer compound. In fact, the carbonaceous material satisfying the requirements of this invention is totally incapable or sparingly capable of incorporating therein such anions as $ClO_4^{\ominus}$, $BF_4^{\ominus}$, and $Br^{\ominus}$ which readily form a layer compound jointly with graphite.

It is also a fact that unlike the large surface area carbonaceous material like activated carbon which, as described in the specification of Japanese Patent Application Laid-open No. 35881/1983, forms an electric double layer on the surface thereof, the behavior of a capacitor of a sort, the carbonaceous material of the present invention is such that there exists absolutely no correlation between surface area and battery properties and that an increase in surface area rather has an adverse effect on such properties as current efficiency and self-discharging property.

The facts mentioned above differ from the phenomena observed in the conventional carbonaceous material and manifest the following characteristics when the carbonaceous material is used as an active material for a secondary battery. As concerns the cycle life property, the secondary battery using the carbonaceous material provides at least 100 cycles, more than 300 cycles when conditions permit, or even more than 500 cycles under favorable conditions. The current efficiency in charging and discharging is at least 90%, more than 95% when conditions permit, and even more than 98% under favorable conditions. The self-discharging property is not more than 30% month, not more than 20% month when conditions permit, and even not more than 10%/month under favorable conditions. As one of the characteristics of the carbonaceous material satisfying the conditions of the present invention, the very large utilization coefficient can be cited.

The term "utilization coefficient", used in the present invention, is the proportion of electrons (or paired cations) reversibly released and received per carbon atom. It is defined by the following formula.

$$\text{Utilization coefficient} = \frac{\text{Amount of charged and discharged electricity (in AHr)}}{\frac{w \text{ (in g)}}{12} \times 26.8}$$

wherein w stands for the weight of the carbonaceous material used, in g. In the present invention, the utilization coefficient is at least 0.08, preferably not less than 0.15. Thus, the secondary battery small in weight and volume is enabled to store a large amount of electricity.

The n-doped carbonaceous material of the present invention manifests its excellent properties to advantage when it is used as an active material for a secondary battery, particularly as an active material for a negative electrode.

Now, the secondary battery using the active material of the present invention will be described below. In the production of the electrode by the use of the active material for the secondary battery of this invention, the active material can be used in a varying form.

For example, the active material may be in the form of film, fibers, or powder, depending on the nature of application contemplated. Particularly when it comes in the form of powder, it may be molded in the shape of sheet, for example. Regrading the manner of molding, the method which comprises mixing the active material with such a powdery binder as Teflon powder or polyethylene powder and compression molding the resulting mixture is generally utilized.

Preferably, the method which effects the molding of the active material by using an organic polymer dissolved and/or dispersed in a solvent as a binder can be utilized.

The nonaqueous batteries enjoy such merits of quality as high energy density, small size and light weight. They have not yet found extensive utility in general applications because they are inferior to aqueous batteries in terms of output properties. Particularly in the field of secondary batteries which are expected to possess sufficient output properties, the drawback just mentioned constitutes one of the main causes for preventing the nonaqueous batteries from finding practical utility.

The inferior output properties of the nonaqueous batteries are ascribed to the fact that the nonaqueous batteries generally possess such low degrees of ion conductivity as $10^{-2}$ to $10^{-4} \Omega^{-1} \text{cm}^{-1}$, whereas the aqueous batteries possess high degrees of ion conductivity generally on the order of $10^{-1} \Omega^{-1} \text{cm}^{-1}$.

As one means of solving this problem, the idea of increasing the surface area of an electrode, namely using an electrode of a thin membrane having a large surface area, may be conceivable.

The method described above is particularly advantageous for the production of an electrode of a thin membrane having a large surface area.

For the use of the aforementioned organic polymer as a binder, there may be employed a method which comprises preparing a liquid binder by dissolving the organic polymer in a solvent, dispersing the active material for an electrode in the liquid binder, and applying the resulting dispersion on a given substrate, a method which comprises emulsifying the organic polymer in water, dispersing the active material in the aqueous emulsion, and applying the resulting dispersion on a substrate, or a method which comprises premolding the active material and applying a solution and/or dispersion of the organic polymer on the premolded article of the active material. The amount of the binder is not specifically defined. Generally it falls in the range of 0.1 to 20 parts by weight, preferably 0.5 to 10 parts by weight, based on 100 parts by weight of the active material for an electrode.

The organic polymer to be used herein is not specifically defined. When the organic polymer to be used is of a type having a specific dielectric constant exceeding 4.5 at 25° C. and 1 KHz of frequency, it brings about particularly desirable results and exhibits outstanding battery performance as in cyclicity and overvoltage. As concrete examples of the organic polymer satisfying this requirement, there may be cited acrylonitrile, methacrylonitrile, vinyl fluoride, vinylidene fluoride, chloroprene, vinylidene chloride, and other similar polymers, copolymers thereof, and nitrocellulose, cyanoethyl cellulose, and polysulfide rubber.

The electrode is produced by applying the aforementioned coating liquid on a substrate and drying the applied coat. In this case, the active material may be molded jointly with a material for the collector. Alternatively, a collector made of an aluminum foil or a copper foil may be used as the substrate for application of the coating liquid.

The electrode for the battery produced by using the active material of the present invention may incorporate therein a conductor aid and other additives besides the aforementioned binder. It is a requisite that the electrode should contain the active material of this invention in a concentration of at least 25% by weight.

As examples of the conductor aid, metal powders, conductive metal oxide powders, and carbons may be cited. The incorporation of the conductor aid manifests a conspicuous effect when a composite oxide $A_xM_yN_zO_2$ defined in I as the active material of this invention is used.

Among the conductor aids cited above, carbon gives particularly desirable effects. When carbon is incorporated in the electrode in a concentration of 1 to 30 parts by weight based on 100 parts by weight of $A_xM_yN_zO_2$, it conspicuously manifests its effect of notably lowering the overvoltage and improving the cyclicity. This carbon referred herein is required to have the properties quite different from the carbonaceous material II defined in this invention and does not always indicate a specific carbon. Concrete examples of the carbon are graphite and carbon black. The effect manifested by the carbon is especially conspicuous when the carbon is a combination of two grades of carbon, one having an average particle diameter of 0.1 to $10\mu$ and the other an average particle diameter of 0.01 to $0.08\mu$.

As described above, the active material, $A_xM_yN_zO_2$, of this invention indicated in I manifests its effect particularly desirably when it is used as a positive electrode. Then, the material to be used as the negative electrode is not specifically defined. As concrete examples of the material for the negative electrode, there may be cited light metals such as Li and Na, alloys thereof, metal oxides such as $Li_xFe_2O_3$, $Li_xFe_3O_4$, and $Li_xWO_2$, electroconductive macromolecular compounds such as polyacetylene and poly-p-phenylene, carbon fibers of the vapor-phase growth method, and carbonaceous materials such as pitch type carbon and polyacrylonitrile type carbon fibers.

The active material of this invention indicated in II manifests its effect more advantageously when it is used as a negative electrode as already described. Then, the material to be used as the negative electrode is not specifically defined. As examples of the negative electrode, there may be cited $TiS_2$, $TiS_3$, $MoS_3$, $FeS_2$, $Li_{(1-x)}MnO_2$, $Li_{(1-x)}CoO_2$, $Li_{(1-x)}NiO_2$, $V_2O_5$, and $V_6O_{13}$.

The most desirable combination of electrodes is between a positive electrode made of the active material, $A_xM_yN_zO_2$, of this invention indicated as I and a negative electrode made of the active material of this invention indicated as II.

The basic components for the composition of the nonaqueous secondary battery of the present invention are the two electrodes using the aforementioned active materials of this invention, a separator, and a nonaqueous electrolyte.

The material for the separator is not particularly defined. Examples of the material include woven fabric, non-woven fabric, woven fabric of glass fibers, and porous membrane of synthetic resin. When the electrodes to be used are thin membranes of a large surface area as described above, use of a microporous membrane of synthetic resin, particularly of a polyolefin as disclosed in Japanese Patent Application Laid-open No. 59072/1983 for example, proves to be desirable in terms of thickness, strength, and membrane resistance.

The substance for the nonaqueous electrolyte is not specifically defined. Concrete examples of the substance include $LiClO_4$, $LiBF_4$, $LiAsF_6$, $CF_3SO_3Li$, $LiPF_6$, $LiI$, $LiAlCl_4$, $NaClO_4$, $NaBF_4$, $NaI$, $(n-Bu)_4N^{\oplus}ClO_4$, $(n-Bu)_4N^{\oplus}BF_4$, and $KPF_6$. Concrete examples of the organic solvent for the electrolyte include ethers, ketones, lactones, nitriles, amines, amides, sulfur compounds, chlorinated hydrocarbons, esters, carbonates, nitro compounds, phosphoric ester type compounds, and sulfolane type compounds. Among the organic solvents cited above, ethers, ketones, nitriles, chlorinated hydrocarbons, carbonates, and sulfolane type compounds prove particularly desirable. Cyclic carbonates are most desirable selections.

As typical examples of the cyclic carbonate, there may be cited tetrahydrofuran, 2-methyltetrahydrofuran, 1,4-dioxane, anisole, monoglyme, acetonitrile, propionitrile, 4-methyl-2-pentanone, butyronitrile, valeronitrile, benzonitrile, 1,2-dichloroethane, γ-butyrolactone, dimethoxyethane, methyl formate, propylene carbonate, ethylene carbonate, vinylene carbonate, dimethyl formamide, dimethyl sulfoxide, dimethyl thioformamide, sulfolane, 3-methylsulfolane, trimethyl phosphate, triethyl phosphate, and mixtures thereof. These are not exclusive examples.

Optionally, the secondary battery composed as described above may further incorporate therein other parts such as current collectors, terminals, and insulation boards. The structure of the battery is not specifically limited. A paper type battery having a positive electrode, a negative electrode, and optionally a separator superposed in a single layer or a plurality of layers, a lamination type battery, and a cylindrical battery having a positive electrode, a negative electrode, and optionally a separator wound up in a roll are concrete examples of the battery structure.

The battery of the present invention is small and light and excels in cyclicity and self-discharging property and is highly useful as power sources for small electronic devices, electric motorcars, and electric power storages.

Now, the present invention will be described more specifically below with reference to working examples and comparative experiments.

The X-ray diffraction was carried out by following the "Japan Learning and Study Advancement Society Method" with necessary modifications. The true density was determined by the float-and-sink method which comprises comminuting a given carbonaceous material in an agate mortar into powder capable of passing a 150-mesh standard sieve and placing the resulting powder as a sample in a mixed solution of bromoform and carbon tetrachloride at 25° C. In the case of a sample which had values of true density distributed over a range, the value of true density of about 50% of all the particles of the sample sank in the mixed solution was reported as the result of determination.

The determination of relative dielectric constant was carried out under the following conditions.

Temperature: 25° C.
Frequency: 1 kHz
Form of sample: Sheet 0.5 mm in thickness
Apparatus: Dielectric product tester Model TR-10C (Ando Electric Co., Ltd.)

EXAMPLE 1

In an atmosphere of Ar, anthracene oil of room temperature was heated at a temperature increasing rate of 5° C./min. to 1,200° C., at which it was fired for carbonization for one hour. The BET surface area, the $Lc_{(0,0,2)}$ based on X-ray diffraction, and the true density of the resulting carbonaceous material were 60 m²/g, 25 Å, and 2.01 g/cm³ respectively. This sample was comminuted in a ball mill into powder having an average particle diameter of 2μ. A coating liquid was obtained by mixing 1 part by weight of the powdered sample with 2.5 parts by weight of a solution of nitrile rubber (relative dielectric constant 17.3) in methylethyl ketone (2 wt% in concentration). This coating liquid was applied in a thickness of 75 μm on the surface, 1 cm×5 cm, of a copper foil 10 μm in thickness.

The coated copper foil was nipped between SUS nets to form a negative electrode for a battery illustrated in FIG. 1.

Separately, a mixture consisting of 1.05 mols of lithium carbonate, 1.90 mols of cobalt oxide, and 0.084 mol of stannic oxide was calcined at 650° C. for 5 hours and then fired in the air at 850° C. for 12 hours. Consequently, there was obtained a composite oxide of a composition of $Li_{1.03}Co_{0.95}Sn_{0.042}O_2$. This composite oxide was comminuted in a ball mill into powder having an average particle diameter of 3 μm. One part by weight of the powdered composite oxide was mixed with 0.1 part by weight of acetylene black and 1 part by weight of a solution of polyacrylonitrile (relative dielectric constant 5.59) in dimethyl formamide (2 wt% in concentration). The resulting mixture was applied in a thickness of 100 μm on one surface, 1 cm×5 cm, of an aluminum foil 15 μm in thickness.

The coated aluminum foil was nipped between SUS nets to form a positive electrode. A battery using the two electrodes mentioned above was evaluated, with a solution of 0.6 mol of $LiClO_4$ in propylene carbonate used as an electrolyte.

As a separator, a microporous polyethylene membrane 35 μm in thickness was used.

Figure 2:
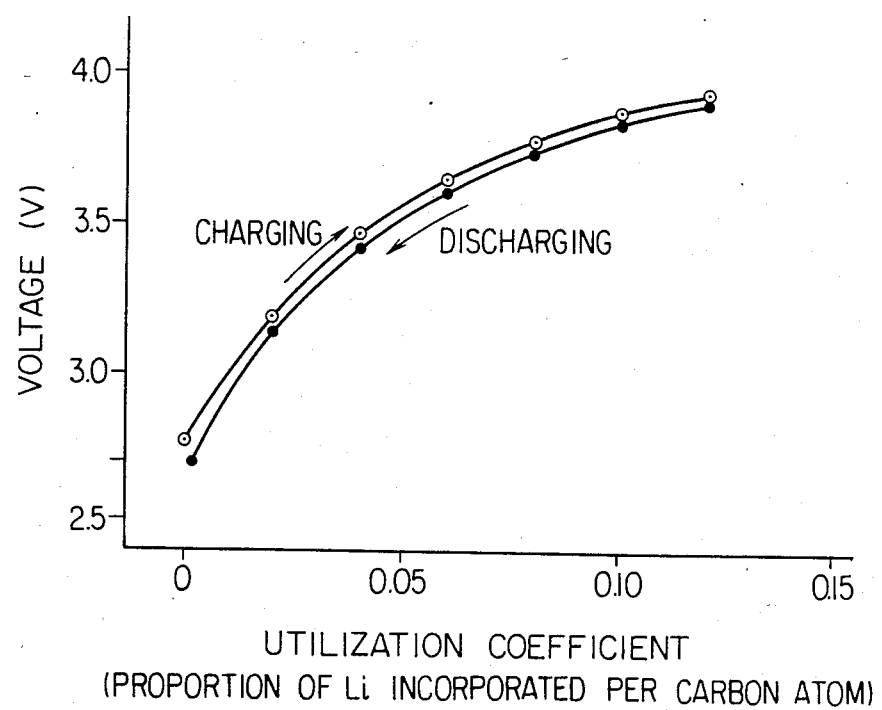
FIG. 2 is a graph illustrating the relation between the charging and discharging voltage and the utilization coefficient obtained by charging and discharging the secondary battery of Example 1.
Figure 3:
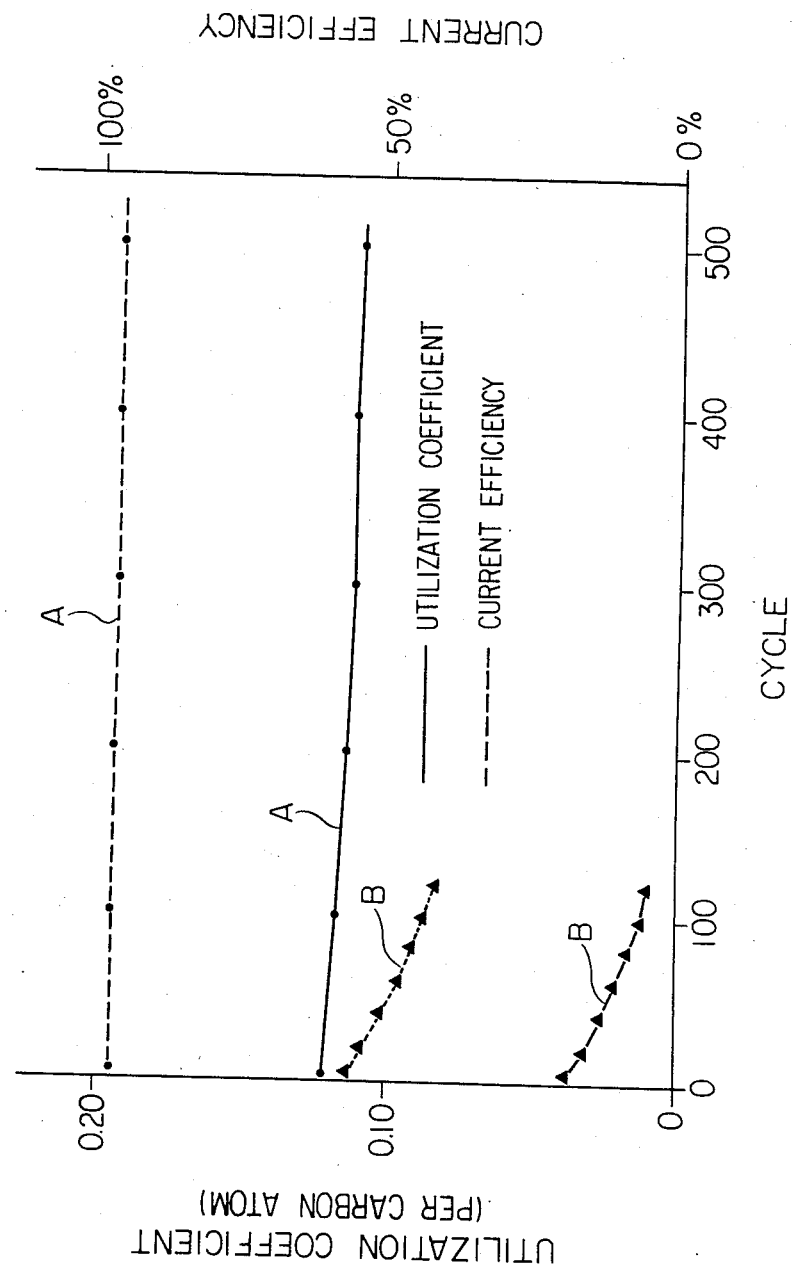
FIG. 3 to FIG. 7 illustrate the changes of current efficiency (broken line) and utilization coefficient with the charging and discharging cycle.

When the battery was charged at a constant current of 2 mA for 50 minutes, it showed an open terminal voltage of 3.9 V. The proportion of $Li^{\oplus}$ ion taken in per carbon atom by this charging, namely the utilization coefficient, was 0.12. Thereafter, the battery was discharged at the same constant current of 2 mA until the voltage fell to 2.7 V. The charging voltage and the discharging voltage involved at this time were as shown in FIG. 2 and the overvoltage was as low as 0.04 V. Thereafter, a charging-discharging cycle (charge stop voltage 3.95 V and discharge stop voltage 2.7 V) was repeated at a constant current 2 mA. The changes of current efficiency and utilization coefficient along the succession of cycles are shown in FIG. 3-A. The energy density (per active material for negative electrode) in the 5th cycle was 911 Whr/kg.

The battery, after 720 hours' standing at 25° C., showed a self-discharge ratio of 15%.

EXAMPLES 2–6 AND COMPARATIVE EXPERIMENTS 1–5

The raw materials shown in Table 1 were carbonized by firing or thermally treated under the conditions similarly shown in Table 1. Batteries using the resulting carbonaceous materials were evaluated by following the procedure of Example 1.

The data obtained in this test concerning the current efficiency and the proportion of $Li^{\oplus}$ ion taken in reversibly per carbon atom, namely the utilization coefficient, were as shown in Table 1.

Table 1 also shows the data concerning the BET surface area, the $Lc_{(002)}$ based on the X-ray diffraction, and the true density. Concerning Comparative Experiment 2, the changes of current efficiency and utilization coefficient during a long series of cycles are shown in FIG. 3-B. The energy density (per active material for negative electrode) in the 5th cycle was 288 Whr/kg. The battery of Comparative Experiment 2, after 720 hours' standing at 25° C., showed a self-discharge ratio of 85%.

TABLE 1

| | Raw material | Conditions of treatment | BET surface area (m²/g) | $Lc_{(002)}$ (Å) | Intersurface distance, $d_{002}$ (Å) | True density (g/cm³) | R I 1360/I 1580 (cm⁻¹/cm⁻¹) | Utilization coefficient (negative electrote) | Current efficiency |
|---|---|---|---|---|---|---|---|---|---|
| Example 2 | Anthracene oil | Sample of Example 1 1400° C., 30 min. (in Ar) | 23 | 45 | 3.45 | 2.12 | 0.91 | 0.11 | 94 |
| Comparative Experiment 1 | Anthracene oil | Sample of Example 1 3000° C., 30 min. (in Ar) | 9 | 500 | 3.39 | 2.20 | 0.09 | 0 | 0 |
| Example 3 | Tetrabenzophenazine | Temp. increasing rate of 5° C./min., 1200° C., one hour (in Ar) | 33 | 25 | 3.49 | 1.98 | 1.22 | 0.12 | 95 |
| Example 4 | Tetrabenzophenazine | Sample of Example 3 1600° C., 30 min. (in Ar) | 21 | 55 | 3.46 | 2.14 | 1.03 | 0.10 | 91 |
| Comparative Experiment 2 | Tetrabenzophenazine | Sample of Example 3 3000° C., 30 min. (in Ar) | 11 | 280 | 3.39 | 2.19 | 0.49 | 0.06 | 69 |
| Example 5 | Coal tar | Temp. increasing rate of 5° C./min., 1400° C., one hour (in Ar) | 17 | 35 | 3.46 | 2.08 | 0.93 | 0.09 | 90 |
| Comparative Experiment 3 | Vinyl chloride | 300° C., on hour (in air) Temp. increasing rate of 5° C./min., 1000° C., one hour (in Ar) | 755 | <10 | 3.69 | 2.05 | 1.87 | 0.11 | 67 |
| Example 6 | Vinyl chloride | Sample of Comparative Experiment 3, 1400° C., 30 min. (in Ar) | 4 | 36 | 3.50 | 1.95 | 1.19 | 0.10 | 92 |

TABLE 1-continued

| | Raw material | Conditions of treatment | BET surface area (m²/g) | $Lc_{(002)}$ (Å) | Intersurface distance, $d_{002}$ (Å) | True density (g/cm³) | R I 1360/I 1580 (cm⁻¹/cm⁻¹) | Utilization coefficient (negative electrode) | Current efficiency |
|---|---|---|---|---|---|---|---|---|---|
| Comparative Experiment 4 | Vinyl chloride | Sample of Comparative Experiment 3, 1600° C., 30 min. (in Ar) | 4 | 59 | 3.45 | 1.90 | 1.21 | 0.04 | 81 |
| Comparative Experiment 5 | Vinylidene chloride | Temp. increasing rate of 5° C./min., 140° C., one hour (in air), 1000° C., one hour (in Ar) | 856 | <10 | 3.69 | 2.02 | 1.92 | 0.08 | 56 |

EXAMPLE 7 AND COMPARATIVE EXPERIMENT 6

The procedure of Example 1 was faithfully repeated, except that the binder shown in Table 2 was used in the place of the binder used in the active material for the negative electrode of Example 1. The charge stop voltage and the overvoltage involved in this case are also shown in Table 2.

TABLE 2

| | Binder | Relative dielectric ratio | Solvent | Charge stop voltage | Overvoltage |
|---|---|---|---|---|---|
| Example 7 | Fluorine rubber | 13.8 | Methyl ethyl ketone | 3.96 | 0.05 |
| Comparative Experiment 6 | Butyl rubber | 2.38 | Toluene | 4.80 | 0.93 |

EXAMPLE 8-10

The procedure of Example 1 was repeated, except that a varying electrolyte shown in Table 3 was used in the place of the solution of 0.6 mol of LiClO₄ in propylene carbonate. The results of the battery evaluation are also shown in Table 3.

TABLE 3

| | Electrolyte | Utilization coefficient (negative electrode) | Current efficiency (%) | Overvoltage |
|---|---|---|---|---|
| Example 8 | 0.6 M LiBF₄/PC* | 0.12 | 97.5 | 0.04 |
| Example 9 | 0.6 M LiClO₄/ ethylene carbonate | 0.12 | 96.6 | 0.05 |
| Example 10 | 0.6 M LiClO₄/ vinylene carbonate | 0.11 | 96.8 | 0.05 |

*PC = Propylene carbonate

EXAMPLE 11

A liquid raw material was prepared by dissolving biscyclopentadienyl iron in a concentration of 1% by weight in benzene.

Inside a tubular furnace provided with a Kanthal wire heater, an alumina furnace core tube 60 mm inside diameter was installed horizontally, with the opposite ends sealed with rubber plugs. An alumina pipe 6 mm in inside diameter for introducing the liquid raw material was passed through one of the two plugs until one end of this pipe reached the central part of the furnace tube at the position having a preliminarily measured inner furnace temperature of 510° C. The other end of the pipe was protruded from the furnace and connected to a metering pump with a rubber tube. To the metering pump, the liquid raw material was fed as pressed with an inert gas. A pipe of the same diameter was passed through the rubber plug on the raw material inlet side so as to introduce an inert gas for displacement of the air entrapped inside the furnace and hydrogen gas for aiding in the growth of fibers through the medium of a rubber tube. These two gases were freely switchable by means of a valve. In the rubber plug on the other end, an alumina pipe 6 mm in inside diameter was laid so as to release the waste gas through the medium of a rubber tube.

First, the air entrapped in the furnace was displaced with an inert gas. After the displacement, the inert gas was switched to hydrogen gas and the furnace was heated until the temperature at the furnace center reached 1200° C. At this time, the temperature at the outlet of the pipe was 500° C. The supply of the hydrogen gas was continued at a flow rate of 1,000 cc/min and, at the same time, the liquid raw material was supplied at a rate of 1 cc/min for about 15 minutes. As the result, 7.1 g of carbon fibers were obtained in the zone of 600° to 1,200° C. The average diameter, the BET surface area, the true density, the intersurface distance, $d_{002}$, based on the X-ray diffraction, and $Lc_{(002)}$ of the carbon fibers were respectively about 4μ, 9 m²/g, 2.03 g/cm³, 3.54 Å, and 38 Å. The amount 5 mg of the carbon fibers of the vapor-phase growth were molded in the form of a sheet 1 cm ×5 cm of area. The sheet was nipped between SUS nets to form a negative electrode for a battery shown in FIG. 1.

Separately, a positive electrode was prepared by molding $LiC_oO_2$ in the form of a sheet 1 cm ×5 cm ×0.1 cm and nipping the sheet between SUS nets. A battery produced by using the electrodes mentioned above and a solution of 0.6M LiClO₄ in propylene carbonate as an electrolyte was evaluated.

A nonwoven fabric of polypropylene was used as a separator.

Figure 4:
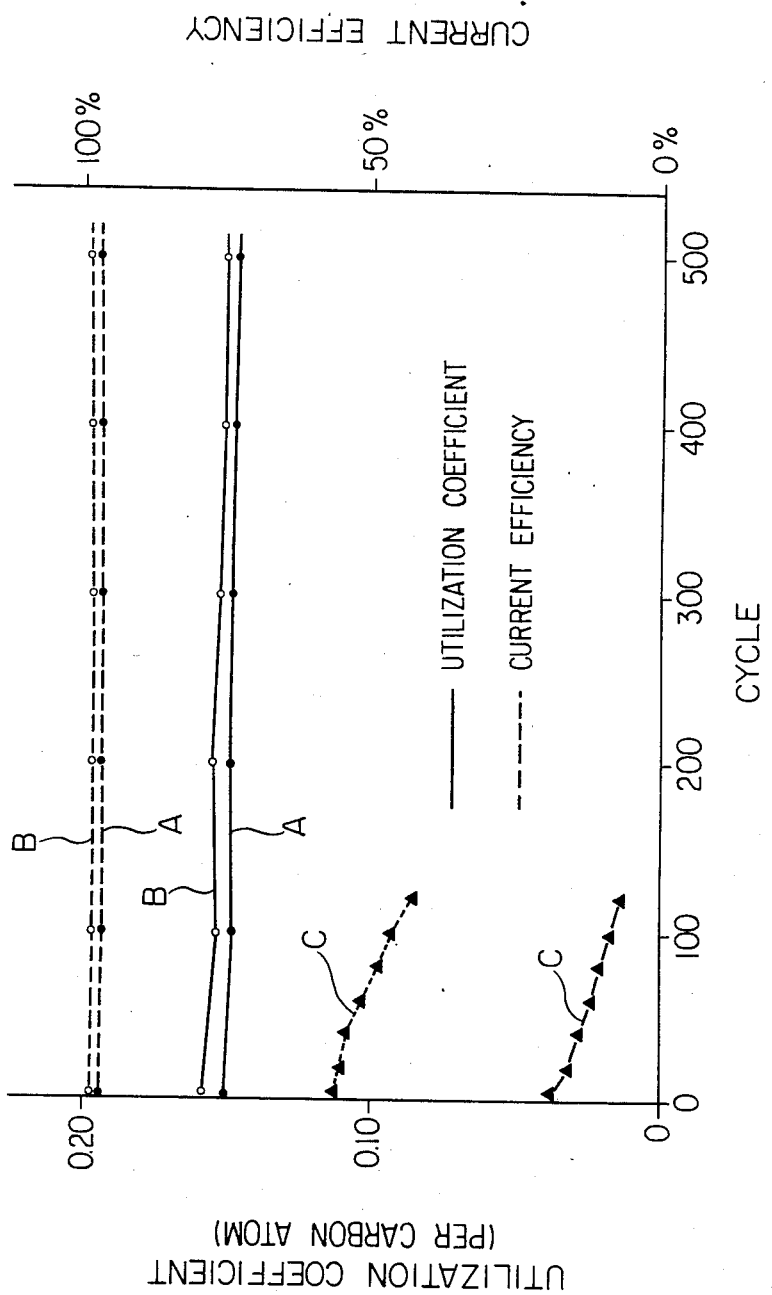

When this battery was charged at a constant current of 2 mA for 50 minutes, it showed an open terminal voltage of 3.9 V. By this charging, the proportion of Li⊕ ion reversibly taken in per carbon atom, namely the utilization coefficient, was 0.15. Thereafter, a charging-discharging cycle (charge stop voltage 3.95 V and discharge stop voltage 2.70 V) was repeated at a constant current of 2 mA. The changes of current efficiency and utilization coefficient during the succession of cycles were as shown in FIG. 4-A. The energy density (per active material for negative electrode) in the 5th cycle was 1139 Whr/kg. This battery, after 720 hours' standing, showed a self-discharge ratio of 7%.

EXAMPLES 12-15 AND COMPARARTIVE EXPERIMENTS 7-8

In an atmosphere of Ar, the carbon fibers of the vapor-phase growth obtained in Example 11 were treated at a varying temperature shown in Table 4 for 30 minutes. Batteries produced were evaluated by following the procedure of Example 11. The data obtained in this test concerning the current efficiency and the utilization coefficient, i.e. the amount of $Li^{\oplus}$ ion taken in reversibly per carbon atom, were as shown in Table 4. This table also shows the data concerning the BET surface area, the true density, and the $Lc_{(002)}$ based on the X-ray diffraction, of the samples after the heat treatment.

and, at the same time, the liquid raw material was supplied at a rate of 2.5 cc/min for three minutes. As the result, 3.7 g of carbon fibers were obtained in the zone of 600° to 1,200° C. The average diameter, the BET surface area, the true density, and $Lc_{(002)}$ based on the X-ray diffraction of the carbon fibers were respectively $0.2\mu$, 16 m²/g, 2.04 g/cm³, and 45 Å. A battery using these carbon fibers of the vapor-phase growth was eval-

TABLE 4

| | Temperature of heat treatment | $Li^{\oplus}$ ion taken in reversibly (per carbon atom) | Intersurface distance $d_{002}$ (Å) | Current efficiency (%) | BET surface area (m²/g) | $Lc_{(002)}$ (Å) | True density (g/cm³) | R I 1360/I 1580 (cm⁻¹/cm⁻¹) |
|---|---|---|---|---|---|---|---|---|
| Example 12 | 1,100° C. | 0.151 | 3.53 | 98.9 | 8 | 40 | 2.03 | 0.96 |
| Example 13 | 1,400° C. | 0.141 | 3.51 | 97.8 | 6 | 45 | 2.09 | 0.89 |
| Example 14 | 1,600° C. | 0.098 | 3.49 | 96.6 | 4 | 54 | 2.10 | 0.82 |
| Example 15 | 1,800° C. | 0.091 | 3.47 | 96.5 | 3 | 60 | 2.12 | 0.64 |
| Comparative Experiment 7 | 2,400° C. | 0.063 | 3.43 | 81.0 | 3 | 210 | 2.15 | 0.14 |
| Comparative Experiment 8 | 2,700° C. | 0 | 3.36 | 0 | 2 | 260 | 2.16 | 0.08 |

EXAMPLE 16

The carbon fibers of the vapor-phase growth obtained in Example 11 were comminuted in a ball mill to obtain crushed carbon fibers of the vapor-phase growth having an average particle diameter of $4\mu$. A mixture of 9 parts by weight of the crushed carbon fibers with 1 part by weight of powdered polyethylene was molded on a SUS net under pressure of 250 kg/cm² to obtain a test piece in the form of a sheet 1 cm ×5 cm in area.

A battery using this test piece as a negative electrode was tested by following the procedure of Example 1. The results are shown in FIG. 4-B.

EXAMPLE 17

A liquid raw material was prepared by dissolving biscyclopentadienyl iron in a concentration of 1% by weight in benzene.

Inside a tubular furnace provided with a Kanthal wire heater, an alumina furnace core tube 60 mm in inside diameter was installed horizontally, with the opposite ends sealed with rubber plugs. An alumina pipe 6 mm in inside diameter for introducing the liquid raw material was passed through one of the two plugs until one end of this pipe reached the central part of the furnace tube at the position having a preliminarily measured inner furnace temperature of 510° C. The other end of the pipe was protruded from the furnace and connected to a metering pump with a rubber tube. To the metering pump, the liquid raw material was fed as pressed with an inert gas. A pipe of the same diameter was passed through the rubber plug on the raw material inlet side so as to introduce an inert gas for displacement of the air entrapped inside the furnace and hydrogen gas for aiding in the growth of fibers through the medium of a rubber tube. These two gases were freely switchable by means of a valve. In the rubber plug on the other end, an alumina pipe 6 mm in inside diameter was laid so as to release the waste gas through the medium of a rubber tube.

First, the air entrapped in the furnace was displaced with an inert gas. After the displacement, the insert gas was switched to hydrogen gas and the furnace was heated until the temperature at the furnace center reached 1200° C. At this time, the temperature at the outlet of the pipe was 500° C. The supply of the hydrogen gas was continued at a flow rate of 2,500 cc/min uated by following the procedure of Example 11. The terminal voltage was 3.9 V and the proportion of $Li^{\oplus}$ ion taken in, namely the utilization coefficient, was 0.14 per carbon atom. The current efficiency was 93%.

COMPARATIVE EXPERIMENT 9

The procedure of Example 16 was faithfully repeated, except that commercially available graphite powder (a product of Lonza SpA having a BET N₂ specific surface area of 22 m²/g, a true density of 2.25 g/cm³, and an intersurface distance, $d_{002}$, of 3.36 Å, and $Lc_{(002)}$ of greater than 1,000 Å, marketed under trademark designation of "Lonza Graphite KS 2.5") was used in the place of the crushed carbon fibers of the vapor-phase growth. Although the battery was charged at a constant current of 2 mA for one hour, it was incapable of discharging. The proportion of $Li^{\oplus}$ ion taken in reversibly was 0.

COMPARATIVE EXPERIMENT 10

The procedure of Example 11 was faithfully repeated, except that commercially available activated carbon fibers (having a BET N₂ specific surface area of 450 m²/g, a true density of 1.70 g/cm³, an intersurface distance, $d_{002}$, of 3.60 Å, and $Lc_{(002)}$ of less than 10 Å) were used in the place of the carbon fibers of the vapor-phase growth.

The changes of current efficiency and utilization coefficient involved in this case are as shown in FIG. 4-C. The energy density (per active material for negative electrode) in the 5th cycle was 228 Whr/kg.

The battery, after 720 hours' standing at 25° C., showed a self-discharge ratio of 85%.

EXAMPLE 18

In the air, polyacrylonitrile fibers were treated at 230° C. for one hour and then in an atmosphere of Ar, heated at 1,000° C., for one hour. The BET surface area, the true density, the intersurface distance, $d_{002}$, based on the X-ray diffraction, and the $Lc_{(002)}$ of the carbonaceous material consequently obtained were respectively 0.6 m²/g, 1.75 g/cm³, 3.60 Å, and 20 Å.

The amount of 5 mg of the carbonaceous material was molded in the form of a sheet 1 cm ×5 cm in area. This sheet was nipped between SUS nets to produce a negative electrode for a battery shown in FIG. 1.

Separately, a mixture consisting of 1.04 mols of lithium carbonate, 1.86 mols of cobalt oxide, and 0.10 mol of stannic oxide was calcined at 650° C. for five hours and then fired in the air at 850° C. for 12 hours. Consequently, there was obtained a composite oxide having a composition of $Li_{1.02}Co_{0.93}Sn_{0.05}O_2$. This composite oxide was comminuted in a ball mill into particles of an average size of 3 μm. Then, 1 part by weight of the composite oxide was mixed with 0.05 part by weight of graphite, 0.05 part by weight of acetylene black, and 1 part by weight of a solution of polyvinylidene fluoride (relative dielectric ratio 8.43) in dimethyl formamide (2 wt% in concentration). The resulting mixture was applied in a thickness of 100 μm on one surface, 1 cm ×5 cm, of an alumina foil 15 μm in thickness. The coated alumina foil was nipped between SUS nets to produce a positive electrode.

A battery using the positive electrode and a solution of 0.6M $LiClO_4$ in propylene carbonate as an electrolyte was evaluated.

A nonwoven fabric of polypropylene was used as a separator.

Figure 5:
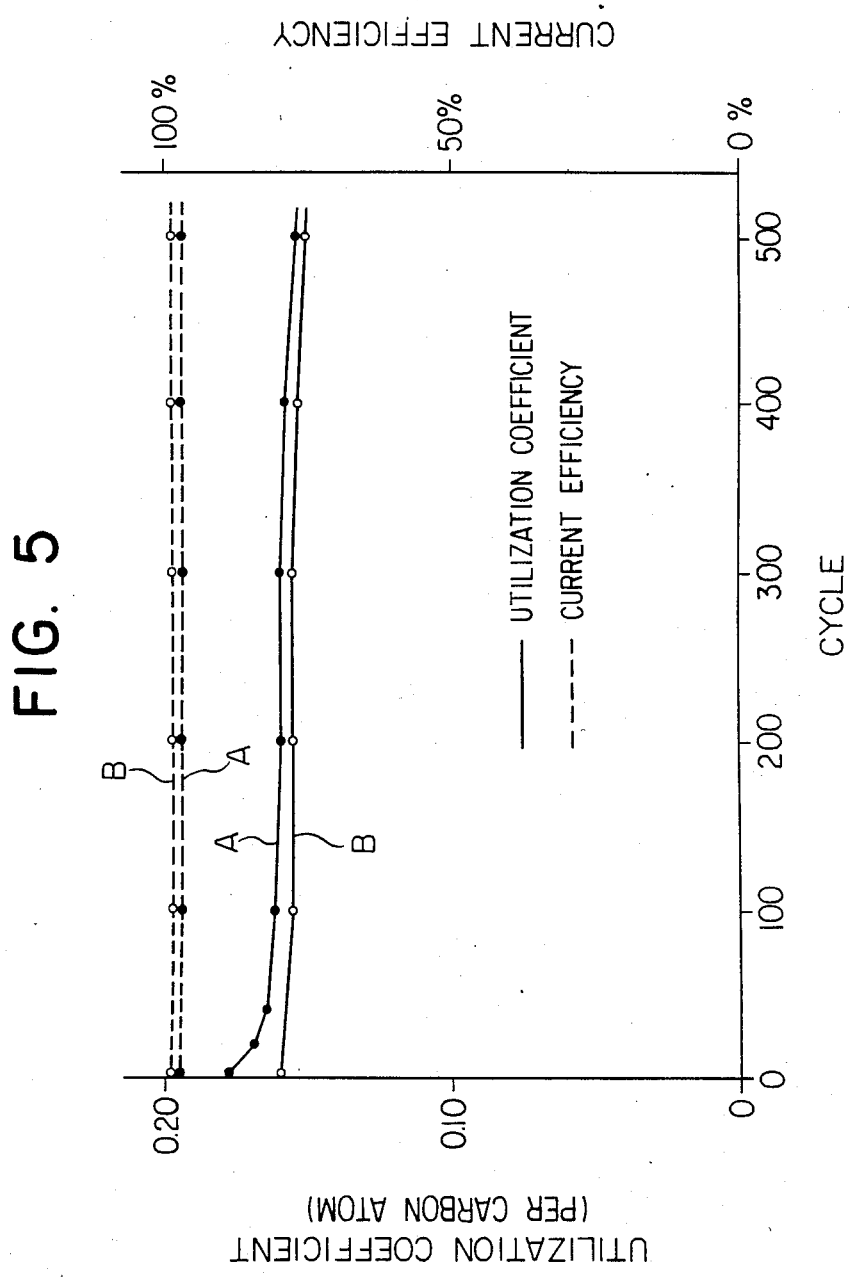

When the battery was charged at a constant current of 2 mA for 50 minutes, it showed an open terminal voltage of 3.9 V. By the charging, the proportion of $Li^\oplus$ ion taken in per carbon atom, namely the utilization coefficient, was 0.17. Thereafter, a charging-discharging cycle (charge stop voltage 3.95 V and discharge stop voltage 27 V) at a constant current of 2 mA was repeated. The changes of current efficiency and utilization coefficient during the succession of cycles were as shown in FIG. 5-A. The energy density (per active material for negative electrode) in the 5th cycle was 1292 Whr/kg. The overvoltage was 0.04 V.

The battery, after 720 hours' standing at 25° C., showed a self-discharge ratio of 8%.

EXAMPLES 19-22 AND COMPARATIVE EXPERIMENTS 11-13

The carbonaceous material obtained by firing in Example 18 was treated in an atmosphere of Ar at a varying temperature shown in Table 5. The battery consequently produced was evaluated by following the procedure of Example 1.

The data obtained in the test concerning the current efficiency and the proportion of $Li^\oplus$ ion taken in reversibly per carbon atom, namely the utilization coefficient, are as shown in Table 5.

This table also shows the data concerning the intersurface distance, $d_{002}$, based on the X-ray diffraction, the $Lc_{(002)}$, the BET surface area, and the true density.

EXAMPLE 23

In the air, powdered polyacrylonitrile was heated at 240° C. for one hour and then, in an atmosphere of Ar, heated at 1,250° C. for one hour. The BET surface area, the true density, the value of $d_{002}$ based on the X-ray diffraction, and the value of $Lc_{(002)}$ of the carbonaceous powder were respectively 9 m²/g, 1.80 g/cm³, 3.56 Å, and 20 Å. The powder had an average particle diameter of 3μ. A mixture of 1 part by weight of this powder with 1 part by weight of a solution of polyacrylonitrile (in a concentration of 4% by weight) in dimethyl formamide was applied in a thickness of 75 μm on one surface, 1 cm ×5 cm in area, of nickel foil 50 μm in thickness. The coated nickel foil was nipped between SUS nets to produce a negative electrode. A battery using this negative electrode was tested for battery properties by faithfully following the procedure of Example 18. The results are as shown in FIG. 5-B.

EXAMPLE 24

Figure 6:
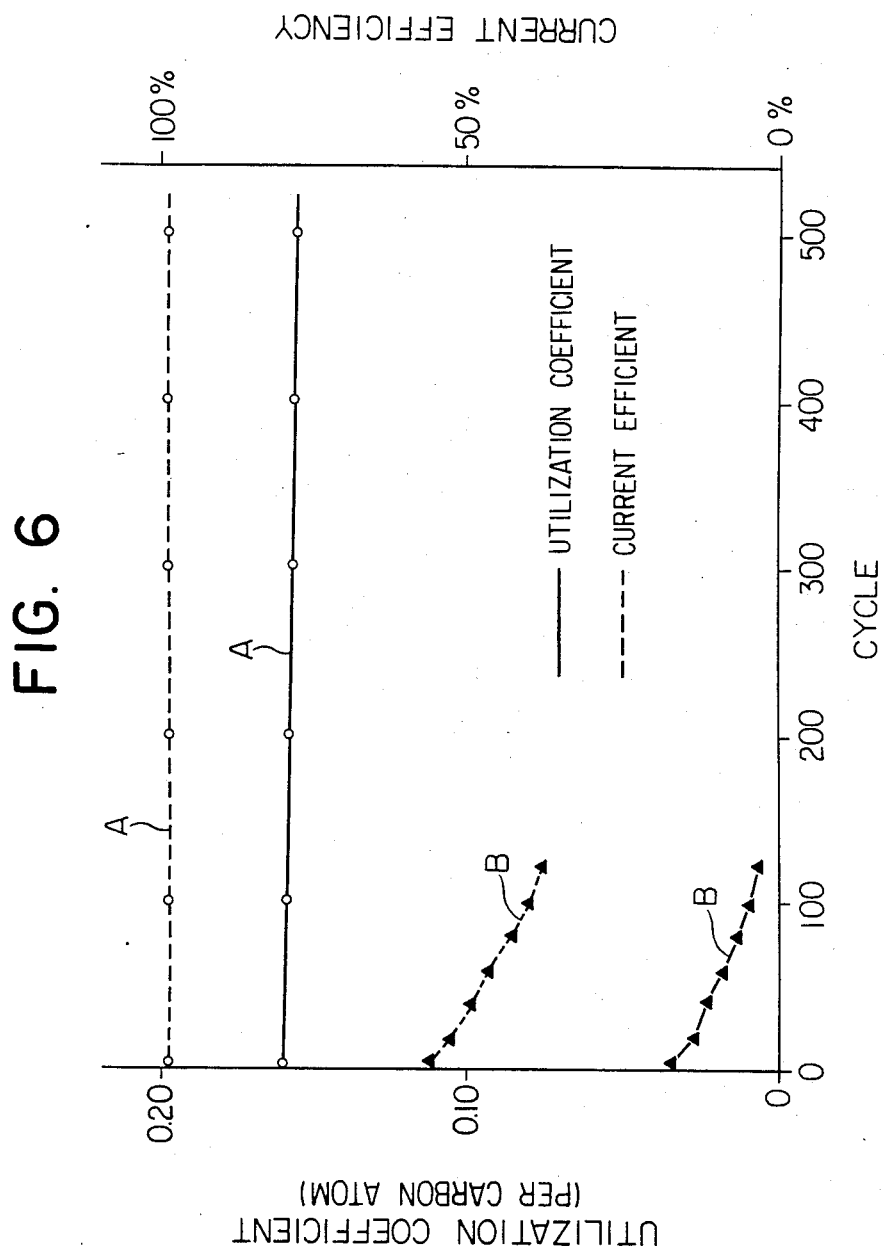

In an atmosphere of Ar, asphalt pitch of room temperature was heated at a temperature increasing rate of 10° C./min, held at 530° C. for one hour, and fired for carbonization at 1,150° C. for one hour. The BET surface area, the true density, the intersurface distance, $d_{002}$, based on the X-ray diffraction, and the value of $Lc_{002}$ of the consequently produced carbonaceous material were respectively 47 m²/g, 2.00 g/cm³, 3.48 Å, and 26 Å. This carbonaceous material was comminuted in a ball mill into particles of an average diameter of 1.5 μm. The procedure of Example 1 was faithfully repeated, except that this powder was used in the place of the powdered carbonization product of anthracene oil. The results of the battery evaluation are as shown in FIG. 6-A.

The energy density (per active material for negative electrode) in the 5th cycle was 121.6 Whr/kg. This battery, after 720 hours' standing at 25° C., showed a self-discharge ratio of 7%.

EXAMPLES 25-32 AND COMPARATIVE EXPERIMENTS 14-17

A carbonaceous material was obtained by subjecting a varying grade of pitch indicated in Table 6 to carbonization by firing under a varying set of conditions indicated in Table 6. A battery using this carbonaceous material was evaluated by following the procedure of Example 24. In this test, the current efficiency and the proportion of $Li^\oplus$ ion taken in reversibly per carbon atom, namely the utilization coefficient, were as shown in Table 6. The table also shows the BET surface area,

TABLE 5

|  | Temperature of heat treatment | Utilization coefficient | Current efficiency (%) | Intersurface distance, $d_{002}$ (Å) | $Lc_{(002)}$ (Å) | BET surface area (m²/g) | True density (g/cm³) | R I 1360/I 1580 (cm⁻¹/cm⁻¹) |
|---|---|---|---|---|---|---|---|---|
| Example 19 | 1,100° C. | 0.159 | 98.9 | 3.57 | 16 | 4 | 1.72 | 1.15 |
| Example 20 | 1,400° C. | 0.161 | 99.1 | 3.55 | 20 | 0.6 | 1.75 | 1.07 |
| Example 21 | 1,600° C. | 0.093 | 95.9 | 3.53 | 22 | 0.6 | 1.75 | 1.01 |
| Example 22 | 1,800° C. | 0.081 | 95.1 | 3.49 | 24 | 0.6 | 1.75 | 0.93 |
| Comparative Experiment 11 | 2,400° C. | 0.051 | 83.1 | 3.46 | 30 | 0.6 | 1.75 | 0.83 |
| Comparative Experiment 12 | 2,700° C. | 0.013 | 27.3 | 3.45 | 41 | 0.5 | 1.77 | 0.47 |
| Comparative Experiment 13 | 3,000° C. | 0.010 | 11.1 | 3.41 | 45 | 0.5 | 1.81 | 0.32 | the value of $Lc_{(002)}$ based on the X-ray diffraction, and the true density.

COMPARATIVE EXPERIMENT 18

Figure 7:
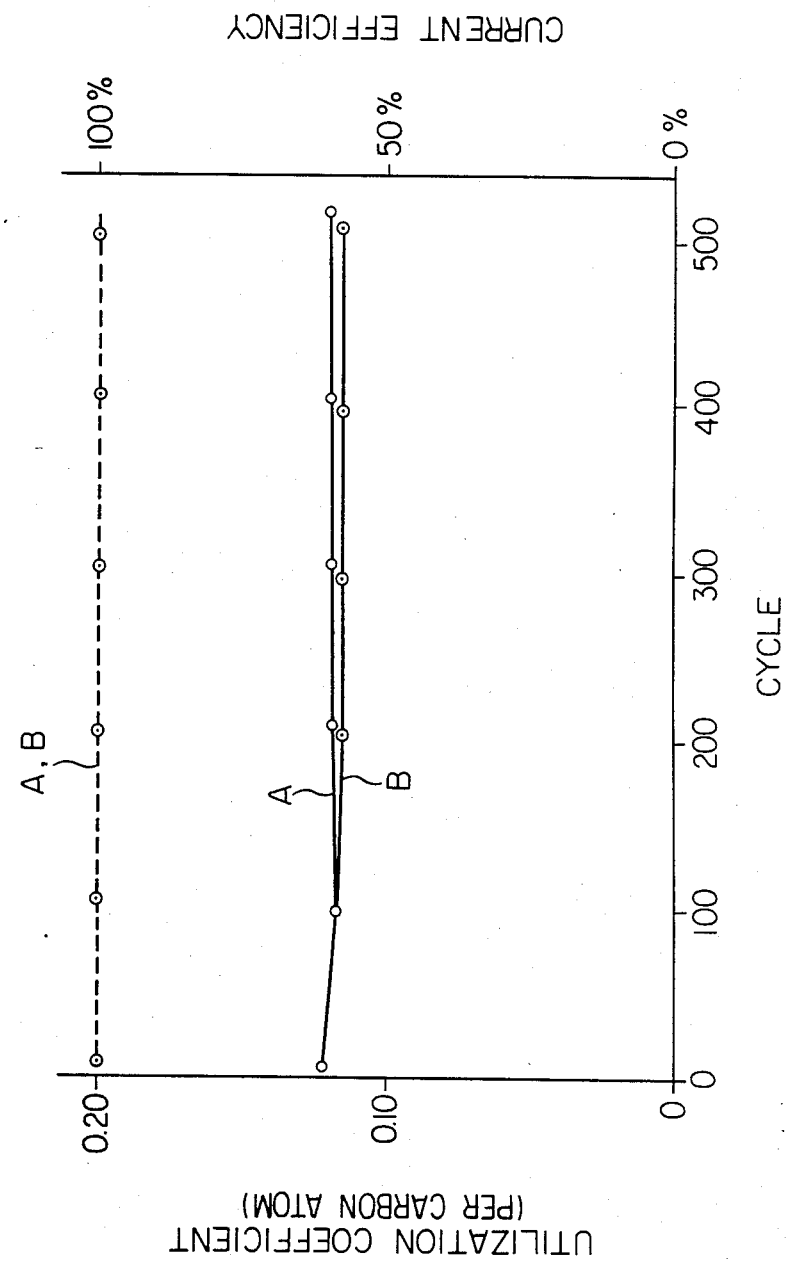

The procedure of Example 1 was faithfully repeated, except that commercially available activated carbon (having a BET surface area of 450 m$^2$/g, a true density of 1.70 g/cm$^3$, an intersurface distance, $d_{002}$, of 3.60 Å, and $Lc_{(002)}$ of less than 10 Å) was used in the place of the powdered carbonization product of anthracene oil. The changes of current efficiency and utilization coefficient involved in this case were as shown in FIG. 6-B. The energy density (per active material for negative electrode) in the 5th cycle was 217 Whr/kg. This battery, after 720 hours' standing at 25° C., showed a self-discharge ratio of 88%.

naceous material consequently produced were respectively 16 m$^2$/g, 2.13 g/cm$^3$, 3.46 Å, and 46 Å. This carbonaceous material was comminuted in a ball mill into powder having an average particle diameter of 5 μm. The procedure of Example 1 was faithfully repeated, except that this powder was used in the place of the powdered carbonization product of anthracene oil. The results are as shown in FIG. 7-A. The energy density (per active material for negative electrode) in the 5th cycle was 911 Whr/kg. The battery, after 720 hours' standing at 25° C., showed a self-discharge ratio of 7%.

EXAMPLES 34–35 AND COMPARATIVE EXPERIMENTS 19–20

A carbonaceous material was prepared by subjecting a varying grade of raw coke indicated in Table 7 to

TABLE 6

| | Raw material pitch | Conditions of heat treatment | | | BET surface area (m$^2$/g) | $Lc_{(002)}$ (Å) | Intersurface distance $d_{002}$ (Å) | True density (g/cm$^3$) | R I 1360/I 1580 (cm$^{-1}$/cm$^{-1}$) | Utilization coefficient (negative electrode) | Current efficiency (%) |
|---|---|---|---|---|---|---|---|---|---|---|---|
| | | Temp. increasing rate (°C./min) | Temp. retained | Temp. of carbonization | | | | | | | |
| Example 25 | Asphalt pitch | 10 | 530° C. one hour | 1100° C. one hour | 12 | 20 | 3.49 | 1.98 | 1.08 | 0.17 | 98.9 |
| Example 26 | Asphalt pitch | 10 | 530° C. one hour | 1400° C. one hour | 5.9 | 44 | 3.47 | 2.11 | 0.96 | 0.15 | 99.3 |
| Example 27 | Asphalt pitch | 10 | 530° C. one hour | 1800° C. one hour | 4.1 | 66 | 3.44 | 2.15 | 0.78 | 0.080 | 95.1 |
| Comparative Experiment 14 | Asphalt pitch | 20 | 530° C. one hour | 2700° C. one hour | 3.6 | 190 | 3.41 | 2.17 | 0.12 | 0.021 | 27.1 |
| Comparative Experiment 15 | Asphalt pitch | 20 | 530° C. one hour | 3000° C. one hour | 3.2 | 260 | 3.39 | 2.20 | 0.08 | 0 | 0 |
| Example 28 | Crude oil decomposition pitch | 10 | 550° C. one hour | 1150° C. one hour | 11 | 25 | 3.48 | 1.99 | 0.99 | 0.16 | 98.1 |
| Example 29 | Crude oil decomposition pitch | 10 | 550° C. one hour | 1400° C. one hour | 6.8 | 40 | 3.47 | 2.10 | 0.83 | 0.10 | 99.5 |
| Comparative Experiment 16 | Crude oil decomposition pitch | 20 | 550° C. one hour | 2700° C. one hour | 4.2 | 200 | 3.40 | 2.18 | 0.09 | 0.017 | 11.3 |
| Example 30 | Coal tar pitch | 10 | 460° C. one hour | 1150° C. one hour | 9.1 | 27 | 3.49 | 2.01 | 1.07 | 0.15 | 98.2 |
| Example 31 | Coal tar pitch | 10 | 460° C. one hour | 1100° C. one hour | 13 | 20 | 3.51 | 1.95 | 1.12 | 0.16 | 97.6 |
| Example 32 | Coal tar pitch | 10 | 460° C. one hour | 1500° C. one hour | 5.2 | 46 | 3.45 | 2.13 | 0.89 | 0.10 | 99.4 |
| Comparative Experiment 18 | Coal tar pitch | 100 | — | 1100° C. one hour | 61 | 20 | 3.58 | 1.70 | 1.27 | 0.060 | 89.7 |

EXAMLE 33

In an atmosphere of Ar, raw coke of petroleum origin was heated from room temperature at a temperature increasing rate of 10° C./min and carbonized by firing at 1,400° C. for 0.5 hour. The BET surface area, the true density, the intersurface distance, $d_{002}$, based on the X-ray diffraction, and the value of $Lc_{(002)}$ of the carbocarbonization by firing under a varying set of conditions indicated in Table 7. A battery using the carbonaceous material was evaluated by following the procedure of Example 33. The results are shown in Table 7. This table also shows the data concerning the BET surface area, the true density, the intersurface distance, $d_{(002)}$, based on the X-ray diffraction, and the value of $Lc_{(002)}$.

TABLE 7

| | Raw coke | Conditions of heat treatment | | BET surface area (m$^2$/g) | True density (g/cm$^3$) | Intersurface distance $d_{002}$ (Å) | $Lc_{(002)}$ (Å) | R I 1360/I 1580 (cm$^{-1}$/cm$^{-1}$) | Utilization coefficient (negative electrode) | Current efficiency (%) |
|---|---|---|---|---|---|---|---|---|---|---|
| | | Temp. increasing rate (°C./min) | Temp. of carbonization (°C.) | | | | | | | |
| Example 34 | Raw coke for fuel | 10 | 1400° C. 0.5 hour | 9.0 | 2.07 | 3.47 | 35 | 1.02 | 0.13 | 98.9 |
| Example 35 | Raw coke | 10 | 1300° C. | 0.9 | 2.02 | 3.46 | 20 | 0.98 | 0.11 | 99.2 |

TABLE 7-continued

| | Raw coke | Conditions of heat treatment Temp. increasing rate (°C./min) | Conditions of heat treatment Temp. of carbonization (°C.) | BET surface area (m²/g) | True density (g/cm³) | Inter-surface distance $d_{002}$ (Å) | $Lc_{(002)}$ (Å) | R I 1360/I 1580 (cm⁻¹/cm⁻¹) | Utilization coefficient (negative electrode) | Current efficiency (%) |
|---|---|---|---|---|---|---|---|---|---|---|
| | of coal origin | | 0.5 hour | | | | | | | |
| Comparative Experiment 19 | Raw coke of petroleum origin | 10 | 1700° C. 0.5 hour | 2.3 | 2.17 | 3.44 | 100 | 0.66 | 0.09 | 75.2 |
| Comparative Experiment 20 | Raw coke of coal origin | 10 | 1700° C. 0.5 hour | 8.0 | 2.16 | 3.44 | 93 | 0.68 | 0.09 | 75.8 |

EXAMPLE 36

In a ball mill, commercially available needle coke of petroleum origin (product of Koa Oil Co., Ltd. marketed under trademark designation of "KOA-SJ Coke") was comminuted into particles of an average diameter of 10 μm. The procedure of Example 1 was faithfully repeated, except that the powder consequently obtained was used in the place of the powdered carbonization product of anthracene oil. The results are as shown in FIG. 7-B.

The BET surface area, the true density, the intersurface distance, $d_{002}$, based on the X-ray diffraction, and the value of $Lc_{(002)}$ of the needle coke were respectively 11 m²/g, 2.13 g/cm³, 3.44 Å, and 52 Å.

EXAMPLES 37–40

The procedure of Example 36 was repeated, except that a varying grade of coke indicated in Table 8 was used in the place of the needle coke of petroleum origin (product of Koa Oil Co., Ltd. marketed under trademark designation of "KOA SJ-Coke"). The BET surface area, the true density, the intersurface distance, $d_{002}$, based on the X-ray diffraction, and the value of $Lc_{(002)}$ obtained as the result are as shown in Table 8.

TABLE 8

| | Coke | Maker and product designation | BET surface area (m²/g) | True density (g/cm³) | Inter-surface distance $d_{002}$ (Å) | $Lc_{(002)}$ (Å) | R I 1360/I 1580 (cm⁻¹/cm⁻¹) | Utilization coefficient (negative electrode) | Current efficiency (%) |
|---|---|---|---|---|---|---|---|---|---|
| Example 37 | Needle coke of petroleum origin | P-Coke of Nippon Mining Co., Ltd. | 4.4 | 2.15 | 3.46 | 46 | 1.00 | 0.12 | 99.1 |
| Example 38 | Needle coke of coal origin | LPC-u of Shin-Nittetsu Kagaku K. K. | 3.5 | 2.13 | 3.46 | 45 | 0.99 | 0.12 | 99.0 |
| Example 39 | Needle coke of coal origin | Needle coke of Mitsubishi Chemical Industries, Ltd. | 3.5 | 2.14 | 3.45 | 63 | 0.89 | 0.12 | 96.4 |
| Example 40 | Pitch coke | Pitch coke of Mitsubishi Chemical Industries, Ltd. | 6.8 | 2.03 | 3.48 | 27 | 1.03 | 0.13 | 99.2 |

EXAMPLE 41 AND COMPARATIVE EXPERIMENTS 21–27

The procedure of Example 1 was faithfully repeated, except that a varying carbonaceous material indicated in Table 9 was used in the place of the powdered carbonization product of anthracene oil. The BET surface area, the true density, the intersurface distance, $d_{002}$, based on the X-ray diffraction, and the value of $Lc_{(002)}$ are as shown in Table 9.

TABLE 9

| | Carbonaceous material | Maker and product designation | Treatment | BET surface area (m²/g) | True density (g/cm³) | Inter-surface distance, $d_{002}$ (Å) | $Lc_{(002)}$ (Å) | R I 1360/I 1580 (cm⁻¹/cm⁻¹) | Utilization coefficient (negative electrode) | Current efficiency (%) |
|---|---|---|---|---|---|---|---|---|---|---|
| Example 41 | Furnace black | SEVACARB MT-CI of Columbia Chemicals Co. | — | 8 | 1.85 | 3.67 | 17 | 1.46 | 0.15 | 97.8 |
| Comparative Experiment 21 | Furnace black | RAVEN 5250 of Columbia Chemicals Co. | — | 525 | 1.85 | 3.69 | 17 | 1.19 | 0.01 | 61 |
| Comparative Experiment 22 | Channel black | Super Spectra of Columbia | — | 742 | 1.85 | 3.69 | 16 | 1.33 | 0.02 | 51 |

TABLE 9-continued

| Comparative Experiment | Carbon-aceous material | Maker and product designation | Treatment | BET surface area ($m^2/g$) | True density ($g/cm^3$) | Inter-surface distance, $d_{002}$ (Å) | $L_{c(002)}$ (Å) | R I 1360/I 1580 ($cm^{-1}/cm^{-1}$) | Utilization coefficient (negative electrode) | Current efficiency (%) |
|---|---|---|---|---|---|---|---|---|---|---|
| Comparative Experiment 23 | Acetylene black | Denka Black of Denki Kagaku Kogyo K.K. Chemicals Co. | — | 61 | 1.95 | 3.48 | 47 | 0.87 | 0.07 | 72 |
| Comparative Experiment 24 | Carbon black | Ketchen Black EC of Lion Akzo Co. | | 850 | 2.20 | 3.42 | <10 | 0.84 | 0.04 | 16 |
| Comparative Experiment 25 | Pitch type carbon fiber | KCF-100 of Kureha Chemical Industry Co., Ltd. | Comminuting in ball mill | 66 | 1.65 | 3.62 | 15 | 1.26 | 0.12 | 77 |
| Comparative Experiment 26 | Pitch type carbon fiber | KCF-200 of Kureha Chemical Industry Co., Ltd. | Comminuting in ball mill | 58 | 1.57 | 3.50 | 17 | 1.01 | 0.10 | 82 |
| Comparative Experiment 27 | Glassy carbon | GC-30 of Tokai Carbon Co., Ltd. | Comminuting in ball mill | 90 | 1.70 | 3.45 | 39 | 1.93 | 0.02 | 67 |

EXAMPLE 42

A mixture consisting of 1.05 mols of lithium carbonate, 1.90 mols of cobalt oxide, and 0.084 mol of stannic oxide was calcinated at 650° C. for five hours and then, in the air, fired at 850° C. for 12 hours. Consequently, there was obtained a composite oxide having a composition of $Li_{1.03}Co_{0.95}Sn_{0.042}O_2$. This composite oxide was comminuted in a ball mill into particles of an average diameter of 3 μm. Then 1 part by weight of this composite oxide was mixed with 1 part by weight of a solution of polyacrylonitrile (concentration 2% by weight) in dimethyl formamide and 0.2 part by weight of graphite as an electroconducting aid. The resulting mixture was applied in a thickness of 75 μm on one surface, 1 cm×5 cm, of an aluminum foil 15 μm in thickness.

A battery shown in FIG. 1 was produced by using the coated aluminum foil as a positive electrode, a lithium piece as a negative electrode, and a solution of 0.6M $LiClO_4$ in propylene carbonate as an electrolyte.

Figure 8:
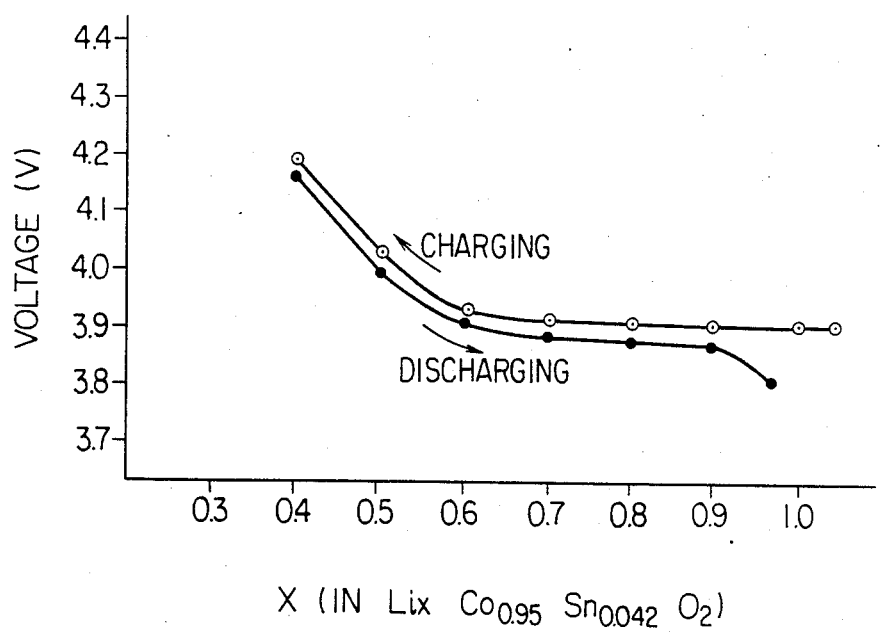
FIG. 8 is a graph illustrating the constant current, charging voltage, and discharging voltage of the battery of Example 42.

This battery was charged at a constant current of 25 mA (current density 5 $mA/cm^2$) for 30 minutes and then discharged at the same constant current of 25 mA until 3.8 V. The charging voltage and the discharging voltage involved in this case are shown in FIG. 8. The overvoltage was extremely small.

Figure 9:
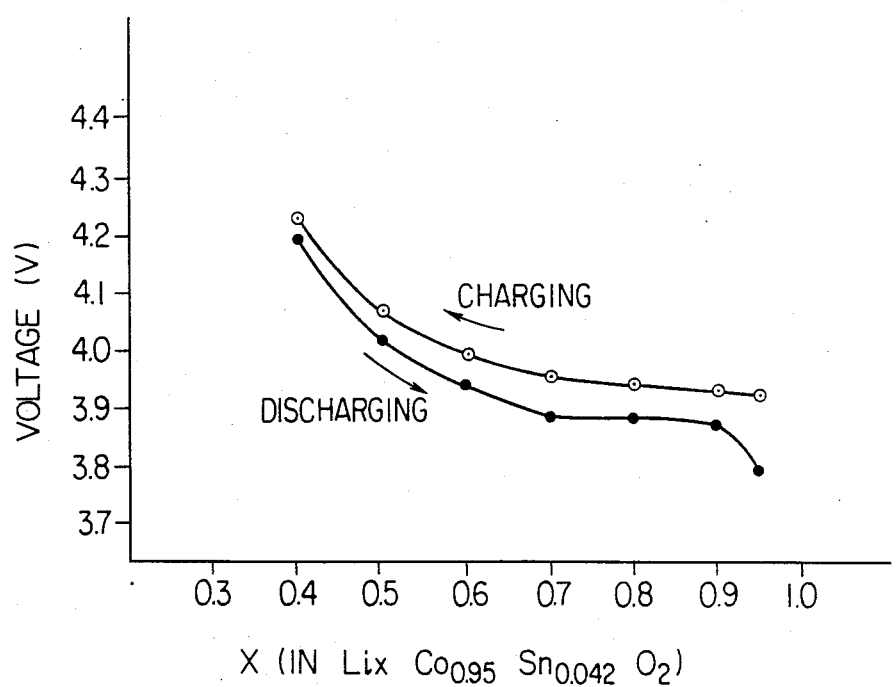
FIG. 9 is a graph illustrating the charging voltage and discharging voltage when the charging and discharging cycle of the battery of Example 42 has counted 500.

Thereafter, a charging-discharging cycle was repeated. The charging voltage and the discharging voltage in the 500th cycle are as shown in FIG. 9, indicating that the voltages were not substantially changed.

EXAMPLES 43–44 AND COMPARATIVE EXPERIMENTS 29–31

The procedure of Example 42 was repeated, except that the amounts of lithium carbonate, cobalt oxide, and stannic oxide were varied as shown in Table 10. Consequently, various composite oxides were obtained. Their percentage compositions are also shown in Table 10.

TABLE 10

| | Starting composition | | | |
|---|---|---|---|---|
| | Lithium carbonate (mol) | Cobalt oxide (mol) | Stannic oxide (mol) | Composition of composite oxide |
| Example 43 | 1.03 | 1.77 | 0.14 | $Li_{1.01}Co_{0.88}Sn_{0.07}O_2$ |
| Example 44 | 1.06 | 1.98 | 0.02 | $Li_{1.03}Co_{0.99}Sn_{0.01}O_2$ |
| Comparative Experiment 29 | 1.03 | 2.02 | 0 | $Li_{1.00}Co_{1.01}O_2$ |
| Comparative Experiment 30 | 1.15 | 1.92 | 0.22 | $Li_{1.11}Co_{0.96}Sn_{0.11}O_2$ |
| Comparative Experiment 31 | 1.06 | 2.19 | 0.06 | $Li_{1.03}Co_{1.09}Sn_{0.03}O_2$ |

Batteries using these composite oxides were evaluated by following the procedure of Example 1. The data concerning the charge stop voltage, the open terminal voltage, and the overvoltage are shown in Table 11.

TABLE 11

| | Charge stop voltage | Open terminal voltage | Overvoltage |
|---|---|---|---|
| Example 43 | 4.28 | 4.22 | 0.06 |
| Example 44 | 4.31 | 4.23 | 0.08 |
| Comparative Experiment 29 | 4.53 | 4.20 | 0.33 |
| Comparative Experiment 30 | 4.43 | 4.21 | 0.22 |
| Comparative Experiment 31 | 4.51 | 4.21 | 0.30 |

EXAMPLE 45

The procedure of Example 42 was faithfully repeated, except that 0.041 mol of indium oxide was used in the place of 0.082 mol of stannic oxide. A battery using the resulting carbonaceous material was evaluated similarly. The overvoltage of this battery is as shown in Table 12.

EXAMPLE 46

The procedure of Example 42 was faithfully repeated, except that 0.042 mol of aluminum oxide was used in the place of 0.084 mol of stannic oxide. A battery using the resulting carbonaceous material was evaluated. The overvoltage of this battery is as shown in Table 12.

EXAMPLE 47

The procedure of Example 42 was faithfully repeated, except that 1.90 mols of nickel oxide was used in the place of 1.90 mols of cobalt oxide. A battery using the resulting carbonaceous material was evaluated. The overvoltage of this battery is as shown in Table 12.

TABLE 12

| | Composition of composite oxide | Overvoltage |
|---|---|---|
| Example 45 | $Li_{1.01}Co_{0.95}In_{0.04}O_2$ | 0.05 |
| Example 46 | $Li_{1.02}Co_{0.96}Al_{0.04}O_2$ | 0.06 |
| Example 47 | $Li_{1.05}Ni_{0.96}Sn_{0.04}O_2$ | 0.09 |

EXAMPLES 48 AND COMPARATIVE EXPERIMENT 32

The procedure of Example 42 was repeated faithfully except that a varying electroconducting aid indicated in Table 13 was used in the place of 0.2 part by weight of graphite. The overvoltage determined by the test is shown in Table 13.

TABLE 13

| | Electroconducting aid | | Overvoltage |
|---|---|---|---|
| Example 48 | 0.075 part by weight of graphite (average particle diameter 5μ) | + 0.025 part by weight of acetylene black (average particle diameter 0.03μ) | 0.03 |
| Comparative Experiment 32 | None | | 0.40 |

EXAMPLES 49-53 AND COMPARATIVE EXPERIMENTS 33-38

The procedure of Example 42 was faithfully repeated for evaluation of batteries except that a varying solution of binder indicated in Table 14 was used in the place of the solution of polyacrylonitrile in dimethyl formamide. The results determined are as shown in Table 14.

TABLE 14

| | Binder | Relative dielectric ratio | Solvent | Overvoltage |
|---|---|---|---|---|
| Example 49 | Nitrile rubber | 17.3 | Methyl ethyl ketone | 0.03 V |
| Example 50 | Polyvinylidene fluoride | 8.43 | Dimethylformamide | 0.04 V |
| Example 51 | Polychloroprene | 6.53 | Tetrahydrofuran | 0.07 V |
| Example 52 | Polyvinylidene chloride | 5.51 | Tetrahydrofuran | 0.08 V |
| Example 53 | Nitrocellulose | 7.51 | Ethyl acetate | 0.07 V |
| Comparative Experiment 33 | Polybutadiene | 2.51 | Toluene | 0.83 V |
| Comparative Experiment 34 | Polyisoprene | 2.37 | Toluene | 0.75 V |
| Comparative Experiment 35 | Butyl rubber | 2.38 | Toluene | 0.91 V |
| Comparative Experiment 36 | Polymethyl methacrylate | 3.03 | Methylethyl ketone | 0.31 V |
| Comparative Experiment 37 | Polystyrene | 2.51 | Toluene | 0.88 V |
| Comparative Experiment 38 | Styrene/butadiene rubber | 2.53 | Toluene | 0.69 V |

EXAMPLE 54

A battery was produced by faithfully following the procedure of Example 42, except that lithium-aluminum alloy was used in the place of lithium. The battery was charged at a constant current of 10 mA (current density 2 mA/cm$^2$) for 150 minutes (charge stop voltage 3.70 V) and then discharged at the same constant voltage until 3.55 V. The overvoltage was 0.02 V.

EXAMPLE 55

A battery was produced by faithfully following the procedure of Example 42, except that Wood's metal (bismuth-tin-lead-cadmium alloy) was used in the place of lithium. The battery was charged at a constant current of 10 mA (current density 2 mA/cm$^2$) for 150 minutes (charge stop voltage 3.75 V) and then discharged at the same constant voltage until 3.55 V. The overvoltage was 0.02 V.

What is claimed is:

1. A secondary battery comprising positive and negative electrodes, a separator, and a nonaqueous electrolyte, wherein said secondary battery is characterized by having as an active material for either of said positive and negative electrodes:

I: a composite oxide possessing a layer structure and represented by the general formula:

$$A_xM_yN_zO_2$$

wherein A is at least one member selected from the group consisting of alkali metals, M is a transition metal, N is at least one member selected from the group consisting of Al, In, and Sn, and x, y, and z satisfy the expression, $0.05 \leq x \leq 1.10$, $0.85 \leq y \leq 1.00$, and $0.001 \leq z \leq 0.10$, respectively, and II: an n-doped carbonaceous material which has a BET-method specific surface area, A (m$^2$/g), being in the range of $0.2 < A < 100$ and a crystal thickness, Lc (Å), based on X-ray diffraction and a true density, $\rho$ (g/cm$^3$), which satisfies the conditions, $1.70 < \rho < 2.18$ and $10 < Lc < 120\rho - 189$.

2. A secondary battery according to claim 1, wherein said A is at least one member selected from the group consisting of lithium, sodium, and potassium.

3. A secondary battery according to claim 1, wherein said M is at least one member selected from the group consisting of Ni and Co.

4. A secondary battery according to claim 1, wherein said N is Sn.

5. A secondary battery according to claim 1, wherein the carbonaceous material is carbon fibers of the vapor-phase growth method and/or the comminuted product thereof.

6. A secondary battery according to claim 1, wherein the carbonaceous material is a fired carbonization product of pitch.

7. A secondary battery according to claim 1, wherein the carbonaceous material is a fired carbonization product of a polymer of acrylonitrile.

8. A secondary battery according to claim 1, wherein the carbonaceous material is needle coke.

9. A secondary battery according to claim 1, wherein the active material is formed by using an organic polymer dissolved and/or dispersed in a solvent as a binder.

10. A secondary battery according to claim 9, wherein the organic polymer has a specific dielectric constant greater than 4.5 at 25° C. and 1 KHz of frequency.

11. A secondary battery according to claim 9, wherein the organic polymer is at least one polymer or copolymer selected from the group consisting of acrylonitrile, methacrylonitrile, vinyl fluoride, and vinylidene fluoride.

12. A secondary battery according to claim 1, wherein the separator is a polyolefin type microporous membrane.

13. A secondary battery according to claim 1, wherein cyclic carbonate is used as a solvent for the nonaqueous electrolyte.

14. A secondary battery according to claim 13, wherein the cyclic carbonate is at least one member selected from the group consisting of propylene carbonate, ethylene carbonate, and vinylene carbonate.

15. A secondary battery according to claim 1, wherein either of the positive and negative electrodes includes carbon as a conductor aid in a concentration of 1 to 30 parts by weight based on 100 parts by weight of the composite oxide as the active material.

16. A secondary battery according to claim 15, wherein the carbon is at least one member selected from the group consisting of graphite and carbon black.

17. A secondary battery according to claim 15, wherein the carbon is a mixture of carbon having an average particle diameter of 0.1–10μ and carbon having an average particle diameter of 0.01–0.08μ.

18. A secondary battery according to claim 1, wherein the positive electrode is a composite oxide possessing a layer structure and represented by the general formula:

$$A_xM_yN_zO_2$$

wherein A is at least one member selected from the group consisting of alkali metals, M is a transition metal, N is at least one member selected from the group consisting of Al, In, and Sn, and x, y, and z satisfy the expression, $0.05 \leq x \leq 1.10$, $0.85 \leq y \leq 1.00$, and $0.001 \leq z \leq 0.10$, respectively.

19. A secondary battery according to claim 1, wherein the negative electrode is an n-doped carbonaceous material which has a BET-method specific surface area, A (m²/g), being in the range of $0.1 < A < 100$ and a crystal thickness, Lc (Å), based on X-ray diffraction and a true density, $\rho$ (g/cm³), satisfying the conditions, $1.70 < \rho < 2.18$ and $10 < Lc < 120\rho - 189$.

20. A secondary battery according to claim 1, wherein the positive electrode is a composite oxide possessing a layer structure and represented by the general formula:

$$A_xM_yN_zO_2$$

wherein A is at least one member selected from the group consisting of alkali metal, M is a transition metal, N is at least one member selected from the group consisting of Al, In, and Sn, and x, y, and z satisfy the expressions, $0.05 \leq x \leq 1.10$, $0.85 < y \leq 1.00$, and $0.001 \leq z \leq 0.10$, respectively and, the negative electrode is an n-doped carbonaceous material which has a BET-method specific surface area, A (m²/g), being in the range of $0.1 < A < 100$ and a crystal thickness, Lc (Å), based on X-ray diffraction and a true density, $\rho$ (g/cm³), satisfying the conditions, $1.70 < \rho < 2.18$ and $10 < Lc < 120\rho - 189$.

* * * * *